(12) United States Patent  
Kadous et al.

(10) Patent No.: US 8,885,744 B2  
(45) Date of Patent: Nov. 11, 2014

(54) PROVIDING ANTENNA DIVERSITY IN A WIRELESS COMMUNICATION SYSTEM

(75) Inventors: Tamer Kadous, San Diego, CA (US); Naga Bhushan, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 11/937,472

(22) Filed: Nov. 8, 2007

(65) Prior Publication Data

US 2008/0117999 A1   May 22, 2008

Related U.S. Application Data

(60) Provisional application No. 60/865,313, filed on Nov. 10, 2006.

(51) Int. Cl.

| | |
|---|---|
| *H04L 1/02* | (2006.01) |
| *H04B 7/06* | (2006.01) |
| *H04L 1/00* | (2006.01) |
| *H04B 7/04* | (2006.01) |
| *H04L 5/00* | (2006.01) |
| *H04L 25/02* | (2006.01) |
| *H04L 25/03* | (2006.01) |

(52) U.S. Cl.  
CPC ............ *H04L 1/0026* (2013.01); *H04L 5/006* (2013.01); *H04L 25/0228* (2013.01); *H04B 7/0632* (2013.01); *H04L 25/03343* (2013.01); *H04L 5/0071* (2013.01); *H04L 25/0242* (2013.01); *H04L 5/0048* (2013.01); *H04L 5/0023* (2013.01); *H04L 2025/03426* (2013.01); *H04L 5/0091* (2013.01); *H04B 7/0417* (2013.01)  
USPC ...................................................... 375/267

(58) Field of Classification Search  
CPC ........................................................ H04B 7/0632  
USPC .......................................................... 375/267  
See application file for complete search history.

(56) References Cited

U.S. PATENT DOCUMENTS

| | | | |
|---|---|---|---|
| 6,917,821 | B2 | 7/2005 | Kadous et al. |
| 2002/0041680 | A1* | 4/2002 | Cybenko ............................ 380/28 |

(Continued)

FOREIGN PATENT DOCUMENTS

| | | |
|---|---|---|
| CN | 1729634 A | 2/2006 |
| CN | 1739270 A | 2/2006 |

(Continued)

OTHER PUBLICATIONS

Foschini, "Layered Space-Time Architecture for Wireless Communication in a Fading Environment When Using Multi-Element Antennas," Bell Labs Technical Journal, Wiley, CA, vol. 1, No. 2, Sep. 21, 1996, pp. 41-59.

(Continued)

*Primary Examiner* — Michael Neff  
(74) *Attorney, Agent, or Firm* — Anthony R. Morris

(57) ABSTRACT

Systems and methodologies are described that facilitate cycling across antennas for channel quality information (CQI) computation and data transmission in a multiple-input multiple-output (MIMO) wireless communication environment. Pilots can be obtained by a wireless terminal. Further, virtual antennas that can be supported by a channel can be identified based upon an analysis of the pilots. Moreover, CQI computations can be effectuated for each of the supported virtual antennas; thereafter, the CQI data can be sent to a base station for data transmission scheduling. Additionally, the base station can schedule transmission based upon the CQI data and/or fairness considerations. When scheduled, data transmission can occur by cycling across the supported virtual antennas.

50 Claims, 16 Drawing Sheets

(56) References Cited

U.S. PATENT DOCUMENTS

| | | | |
|---|---|---|---|
| 2005/0130684 A1* | 6/2005 | Kim et al. | 455/464 |
| 2006/0039318 A1* | 2/2006 | Oh et al. | 370/328 |
| 2006/0114858 A1 | 6/2006 | Walton et al. | |
| 2006/0161432 A1 | 7/2006 | Zhang et al. | |
| 2006/0209980 A1* | 9/2006 | Kim et al. | 375/267 |
| 2008/0049709 A1* | 2/2008 | Pan et al. | 370/344 |
| 2008/0049820 A1* | 2/2008 | Jia et al. | 375/227 |
| 2008/0063116 A1 | 3/2008 | Yokoyama | |
| 2010/0061482 A1* | 3/2010 | Lee et al. | 375/296 |
| 2010/0296591 A1* | 11/2010 | Xu et al. | 375/259 |

FOREIGN PATENT DOCUMENTS

| | | |
|---|---|---|
| JP | 2005509316 A | 4/2005 |
| JP | 2005341131 A | 12/2005 |
| RU | 2003135853 | 4/2005 |
| WO | 02082689 A2 | 10/2002 |
| WO | WO02093784 A1 | 11/2002 |
| WO | 2004038952 | 5/2004 |
| WO | 2004054191 A1 | 6/2004 |
| WO | WO2005048485 A1 | 5/2005 |
| WO | 2006011345 A1 | 2/2006 |
| WO | WO2006103758 A1 | 10/2006 |
| WO | WO2006116704 A2 | 11/2006 |

OTHER PUBLICATIONS

Ning, et al., "Muitiuser Scheduling in Downlink MIMO/OFDMA System with Transmit Preprocessing," IEEE 2006 Asia-Pacific Conference on Communications, Aug. 1, 2006, pp. 1-5.

Qian, et al., "Downlink Resource Management for Packet Transmission in MIMO-OFDM Wireless Communication Systems," IEEE 2006 International Conference on Communications, Circuits and Systems Proceedings, Jun. 1, 2006, pp. 1165-1169.

International Search Report—PCT/US07/084377, International Searching Authority—European Patent Office, Nov. 24, 2008.

Written Opinion—PCT/US07/084377, International Searching Authority—European Patent Office, Nov. 24, 2008.

Paulraj et al "Introduction to Space-Time Wireless Communications" May 2003, Cambridge University Press, XP002484294.

International Search Report—PCT/US2007/084377, International Search Authorty—European Patent Office—Jul. 14, 2008.

Translation of Office Action in Russian application 2009122207 corresponding to U.S. Appl. No. 11/937,472.

Taiwan Search Report—TW096142764—TIPO—Dec. 28, 2011.

* cited by examiner

PROVIDING ANTENNA DIVERSITY IN A WIRELESS COMMUNICATION SYSTEM

CROSS-REFERENCE TO RELATED APPLICATIONS

This application claims the benefit of U.S. Provisional Patent application Ser. No. 60/865,313 entitled "METHOD AND APPARATUS FOR PROVIDING ANTENNA DIVERSITY IN A WIRELESS COMMUNICATION SYSTEM" which was filed Nov. 10, 2006. The entirety of the aforementioned application is herein incorporated by reference.

BACKGROUND

I. Field

The following description relates generally to wireless communications, and more particularly to spatial cycling across antennas for channel quality information (CQI) computation and data transmission in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple wireless terminals. Each wireless terminal can communicate with one or more base stations via transmissions on forward and reverse links. The forward link (or downlink) refers to the communication link from base stations to wireless terminals, and the reverse link (or uplink) refers to the communication link from wireless terminals to base stations. Further, communications between wireless terminals and base stations can be established via single-input single-output (SISO) systems, multiple-input single-output (MISO) systems, multiple-input multiple-output (MIMO) systems, and so forth.

In a wireless communication system, a transmitter (e.g., a base station or a terminal) can utilize multiple (T) transmit antennas for data transmission to a receiver equipped with one or more (R) receive antennas. Multiple transmit antennas can be used to increase system throughput by transmitting different data from these antennas and/or to improve reliability by transmitting data redundantly. For example, the transmitter can transmit a given symbol from all T transmit antennas, and the receiver can receive multiple versions of this symbol via the R receive antennas. These multiple versions of the transmitted symbol generally improve the receiver's ability to recover the symbol.

Transmission performance can be improved by exploiting the spatial dimension obtained with the multiple transmit antennas and, if present, the multiple receive antennas. A propagation path exists between each pair of transmit and receive antennas. T·R different propagation paths are formed between the T transmit antennas and the R receive antennas. These propagation paths can experience different channel conditions (e.g., different fading, multipath, interference effects, . . . ) and can achieve different signal-to-noise-and-interference ratios (SNRs). The channel responses for the T·R propagation paths can vary from path to path and can further vary across frequency for a dispersive wireless channel and/or over time for a time-variant wireless channel.

A major drawback to using multiple transmit antennas for data transmission is that the channel response between each pair of transmit and receive antennas (or each propagation path) typically needs to be estimated in order to properly receive the data transmission. Estimation of the full channel response for all T·R transmit and receive antenna pairs can be undesirable for several reasons. For instance, a large amount of link resources can be consumed in order to transmit a pilot used for channel estimation, which in turn reduces the link resources available to transmit data. Further, channel estimation for all T·R transmit and receive antenna pairs increases processing overhead at the receiver.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating cycling across antennas for channel quality information (CQI) computation and data transmission in a multiple-input multiple-output (MIMO) wireless communication environment. Pilots can be obtained by a wireless terminal. Further, virtual antennas that can be supported by a channel can be identified based upon an analysis of the pilots. Moreover, CQI computations can be effectuated for each of the supported virtual antennas; thereafter, the CQI data can be sent to a base station for data transmission scheduling. Additionally, the base station can schedule transmission based upon the CQI data and/or fairness considerations. When scheduled, data transmission can occur by cycling across the supported virtual antennas.

According to related aspects, a method that facilitates evaluating channel quality information (CQI) in a multiple-input multiple-output (MIMO) wireless communication environment is described herein. The method can include obtaining pilots from a base station. Further, the method can comprise identifying a number of layers supported by a channel based upon an evaluation of the pilots. Moreover, the method can include computing a set of CQIs by cycling through virtual antennas associated with the supported layers, each CQI corresponds to a respective one of the supported layers. The method can additionally include sending the set of CQIs to the base station for scheduling data transmission.

Another aspect relates to a wireless communications apparatus. The wireless communications apparatus can include a memory that retains instructions related to determining a number of layers supported by a channel based upon an evaluation of received pilots, evaluating a set of CQIs by cycling through virtual antennas corresponding to the supported layers, each CQI relates to a respective one of the supported layers, and transmitting the set of CQIs for scheduling data transmission. Further, the wireless communications apparatus can include a processor, coupled to the memory, configured to execute the instructions retained in the memory.

Yet another aspect relates to a wireless communications apparatus that enables computing CQIs in a MIMO wireless communications environment. The wireless communications apparatus can include means for recognizing supported virtual antennas based upon obtained pilots. Further, the wireless communications apparatus can comprise means for determining CQIs for the supported virtual antennas by cycling through the supported virtual antennas. Moreover, the wireless communications apparatus can include means for transmitting the CQIs to a base station for scheduling data transmission.

Still another aspect relates to a machine-readable medium having stored thereon machine-executable instructions for receiving pilots from a base station; determining a number of layers supported by a channel based upon an evaluation of the pilots; generating a set of CQIs by cycling through virtual antennas associated with the supported layers, each CQI corresponds to a respective one of the supported layers; and transferring the set of CQIs to the base station for scheduling data transmission.

In accordance with another aspect, an apparatus in a wireless communication system can include a processor, wherein the processor can be configured to recognize supported virtual antennas based upon obtained pilots. Further, the processor can be configured to determine CQIs for the supported virtual antennas by cycling through the supported virtual antennas. Moreover, the processor can be configured to transmit the CQIs to a base station for scheduling data transmission.

According to other aspects, a method that facilitates transmitting data from a base station in a MIMO wireless communication environment is described herein. The method can comprise sending CQI pilots over a set of virtual antennas. Further, the method can include obtaining one or more CQIs that respectively pertain to one or more supported virtual antennas for a user, the one or more supported virtual antennas being a subset of the virtual antennas. Moreover, the method can include scheduling data transmission for the user based upon the CQI data. Also, the method can include transmitting data by cycling across the one or more supported virtual antennas.

Yet another aspect relates to a wireless communications apparatus that can include a memory that retains instructions related to transmitting pilots over a set of virtual antennas, receiving one or more CQIs that respectively pertain to one or more supported virtual antennas for a user, the one or more supported virtual antennas being a subset of the virtual antennas, scheduling data transmission for the user based upon the CQI data, and transmitting data by cycling over the one or more supported virtual antennas. Further, the wireless communications apparatus can comprise a processor, coupled to the memory, configured to execute the instructions retained in the memory.

Another aspect relates to a wireless communications apparatus that enables scheduling transmission and sending data in a MIMO wireless communication environment. The wireless communications apparatus can include means for transmitting pilots over a set of virtual antennas. Moreover, the wireless communications apparatus can include means for scheduling data transmission for a user based upon received CQIs that respectively correspond to virtual antennas supported by the user. Further, the wireless communications apparatus can include means for transmitting data by cycling across the supported virtual antennas.

Still another aspect relates to a machine-readable medium having stored thereon machine-executable instructions for sending pilots over a set of virtual antennas, the pilots being generated based upon a unitary matrix, scheduling data transmission for a user based upon received CQIs that respectively correspond to virtual antennas supported by the user, and transmitting data by cycling across the supported virtual antennas.

In accordance with another aspect, an apparatus in a wireless communication system can include a processor, wherein the processor can be configured to send CQI pilots over a set of virtual antennas; obtain one or more CQIs that respectively pertain to one or more supported virtual antennas for a user, the one or more supported virtual antennas being a subset of the virtual antennas; schedule data transmission for the user based upon the CQI data; and/or transmit data by cycling across the one or more supported virtual antennas.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
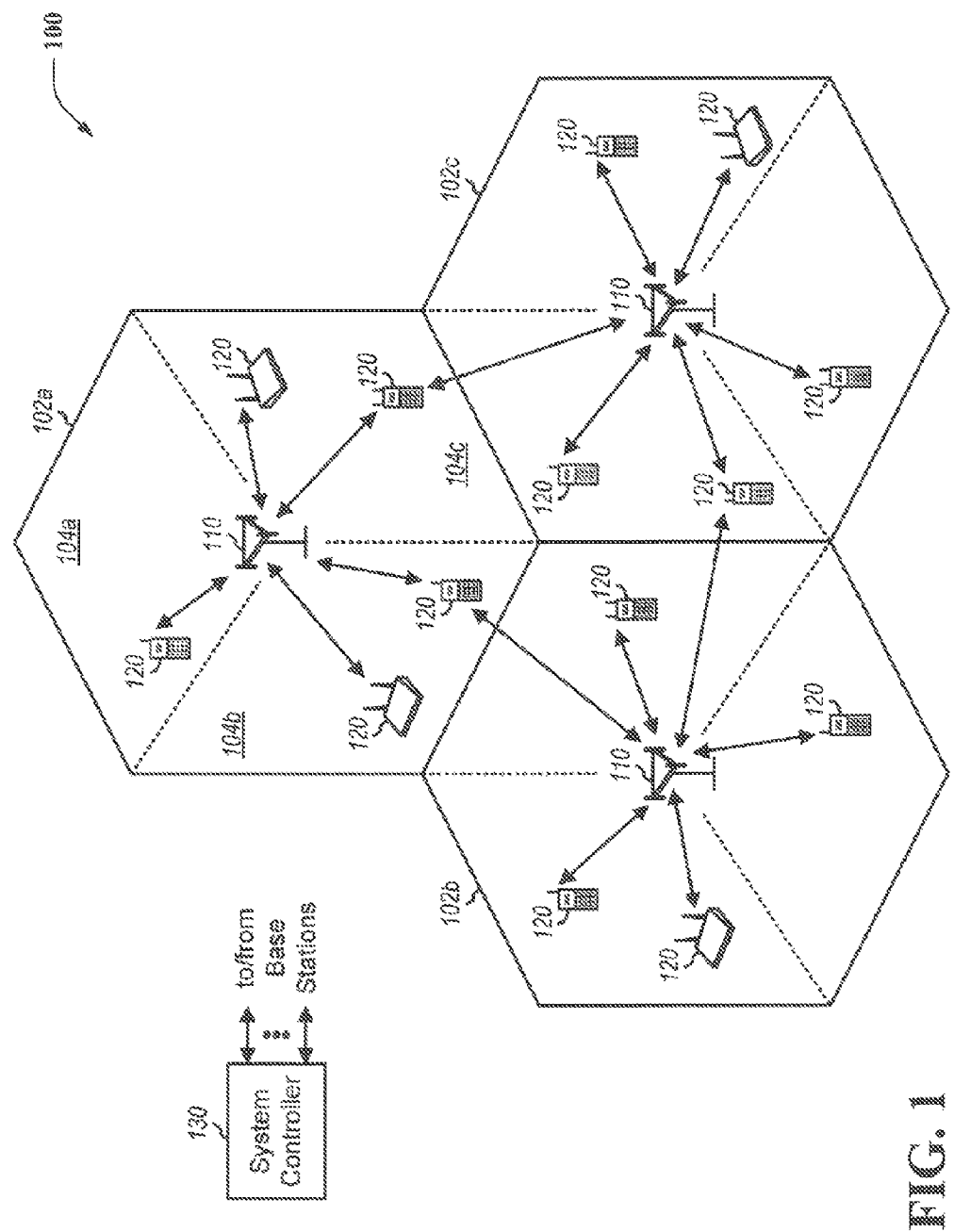
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. As shown, wireless communication system 100 includes multiple base stations 110 and multiple wireless terminals 120 (e.g., terminals). A base station 110 is a station that communicates with the terminals 120. A base station 110 can also be called, and can contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, the term "base station" is used generically for a BTS that serves a sector as well as a base station that serves a cell.

Terminals 120 are typically dispersed throughout the system, and each terminal can be fixed or mobile. A terminal 120 can also be called, and can contain some or all of the functionality of, a mobile station, user equipment, and/or some other device. A terminal can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations 110 to the terminals 120, and the uplink (or reverse link) refers to the communication link from the terminals 120 to the base stations 110.

For a centralized architecture, a system controller 130 couples to base stations 110 and provides coordination and control for these base stations 110. For a distributed architecture, base stations 110 can communicate with one another as needed.

The transmission techniques described herein can be used for various wireless communication systems such as an orthogonal frequency division multiple access (OFDMA) system, a single-carrier frequency division multiple access (SC-FDMA) system, a frequency division multiple access (FDMA) system, a code division multiple access (CDMA) system, a time division multiple access (TDMA) system, and so on. An OFDMA system utilizes orthogonal frequency division multiplexing (OFDM), which is a multi-carrier modulation technique that partitions the overall system bandwidth into multiple (K) orthogonal subbands. These subbands are also called tones, subcarriers, bins, and so on. With OFDM, each subband is associated with a respective subcarrier that can be modulated with data. An SC-FDMA system can utilize interleaved FDMA (IFDMA) to transmit on subbands that are distributed across the system bandwidth, localized FDMA (LFDMA) to transmit on a block of adjacent subbands, or enhanced FDMA (EFDMA) to transmit on multiple blocks of adjacent subbands. In general, modulation symbols are sent in the frequency domain with OFDM and in the time domain with SC-FDMA.

An OFDM symbol can be generated for one transmit antenna in one symbol period as follows. N modulation symbols are mapped to N subbands used for transmission (or N assigned subbands) and zero symbols with signal value of zero are mapped to the remaining K−N subbands. A K-point inverse fast Fourier transform (IFFT) or inverse discrete Fourier transform (IDFT) is performed on the K modulation symbols and zero symbols to obtain a sequence of K time-domain samples. The last Q samples of the sequence are copied to the start of the sequence to form an OFDM symbol that contains K+Q samples. The Q copied samples are often called a cyclic prefix or a guard interval, and Q is the cyclic prefix length. The cyclic prefix is used to combat intersymbol interference (ISI) caused by frequency selective fading, which is a frequency response that varies across the system bandwidth.

An SC-FDMA symbol can be generated for one transmit antenna in one symbol period as follows. N modulation symbols to be sent on N assigned subbands are transformed to the frequency domain with an N-point fast Fourier transform (FFT) or discrete Fourier transform (DFT) to obtain N frequency-domain symbols. These N frequency-domain symbols are mapped to the N assigned subbands, and zero symbols are mapped to the remaining K−N subbands. A K-point IFFT or IDFT is then performed on the K frequency-domain symbols and zero symbols to obtain a sequence of K time-domain samples. The last Q samples of the sequence are copied to the start of the sequence to form an SC-FDMA symbol that contains K+Q samples.

A transmission symbol can be an OFDM symbol or an SC-FDMA symbol. The K+Q samples of a transmission symbol are transmitted in K+Q sample/chip periods. A symbol period is the duration of one transmission symbol and is equal to K+Q sample/chip periods.

The transmission techniques described herein can be used for the downlink as well as the uplink. For clarity, much of the following description is for downlink transmission from a base station 110 (a transmitter) to one or more terminals 120 (receivers).

Figure 2A:
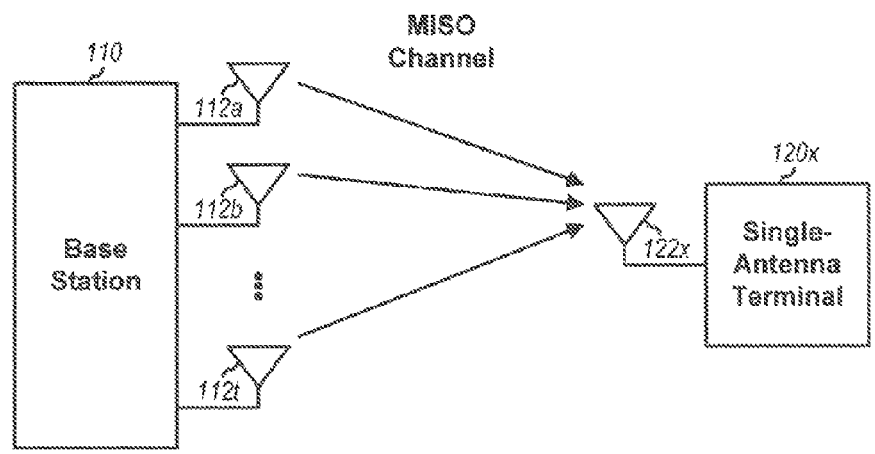
FIGS. 2A and 2B are illustrations of example MISO and MIMO channels, respectively.

FIG. 2A illustrates a multiple-input single-output (MISO) channel formed by multiple (T) transmit antennas 112*a* through 112*t* at base station 110 and a single receive antenna 122*x* at a terminal 120*x*. The MISO channel can be characterized by a 1×T channel response row vector $\underline{h}(k)$ for each subband k, which can be given as:

$$\underline{h}(k) = [h_1(k) h_2(k) \ldots h_T(k)], \quad \text{Eq (1)}$$

where $h_i(k)$, for $i=1, \ldots, T$, denotes the coupling or complex channel gain between transmit antenna i and the single receive antenna for subband k.

Figure 2B:
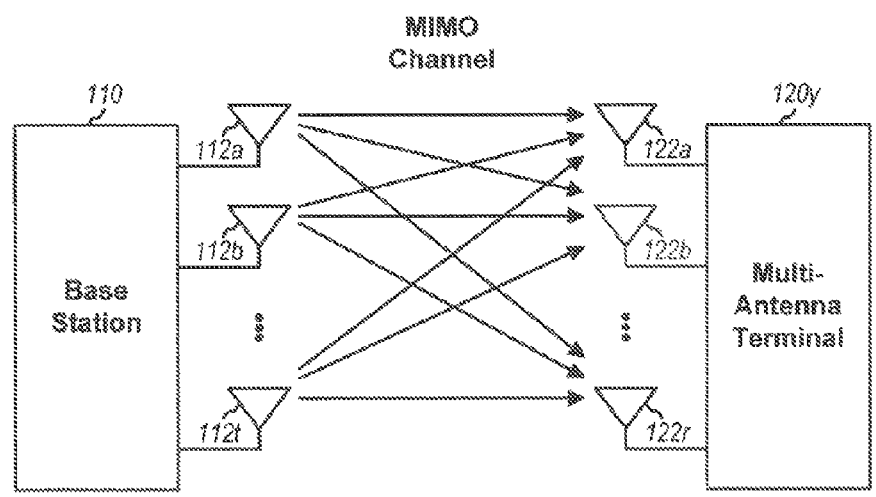

FIG. 2B depicts a multiple-input multiple-output (MIMO) channel formed by the T transmit antennas 112*a* through 112*t* at base station 110 and multiple (R) receive antennas 122*a* through 122*r* at a terminal 120*y*. The MIMO channel can be characterized by an R×T channel response matrix $\underline{H}(k)$ for each subband k, which can be given as:

$$\underline{H}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix} \quad \text{Eq (2)}$$

$$= [\underline{h}_1(k) \underline{h}_2(k) \ldots \underline{h}_T(k)],$$

where $h_{j,i}(k)$, for $j=1, \ldots, R$ and $i=1, \ldots, T$, denotes the complex channel gain between transmit antenna i and receive antenna j for subband k. Additionally, $\underline{h}_i(k)$ is an R×1 channel response vector for transmit antenna i, which is the i-th column of $\underline{H}(k)$.

The transmitter can transmit one or more output symbols from the T transmit antennas 112 on each subband in each symbol period. Each output symbol can be a modulation symbol for OFDM, a frequency-domain symbol for SC-FDMA, or some other complex value. The data transmission can be quantified by the following metrics:

Spatial multiplexing order (M)—the number of output symbols transmitted via the T transmit antennas on one subband in one symbol period;

Spatial diversity order (D)—the amount of spatial diversity observed by the transmitted output symbols; and Channel estimation overhead order (C)—the number of virtual antennas to be estimated by a receiver for each receive antenna.

In general, M≤min {T, R}, D≤T, and C≤T.

If the transmitter transmits output symbols directly from the T transmit antennas 112, then a receiver typically needs to estimate the full channel response for all T transmit antennas 112 in order to recover the data transmission. The channel estimation overhead order is then C=T. In certain scenarios, it can be desirable to transmit fewer than T output symbols simultaneously, e.g., if the channel conditions are poor. A subset of the T transmit antennas can be used to transmit fewer than T output symbols. However, this is undesirable since the transmit powers available for the unused transmit antennas are not judiciously employed for transmission.

The transmission schemes described herein allow for flexible selection of the three metrics M, D and C in order to achieve good performance for data transmission in different conditions. For example, a larger spatial multiplexing order M can be selected for good channel conditions with high SNRs, and a smaller spatial multiplexing order can be selected for poor channel conditions with low SNRs. A lower channel estimation overhead order C can be selected, e.g., in scenarios where low throughput due to low SNRs does not justify a large channel estimation overhead.

The transmission schemes described herein can utilize all T transmit antennas for transmission, regardless of the number of output symbols being sent and regardless of which subbands are used for transmission. This capability allows the transmitter to utilize all of the transmit power available for the T transmit antennas 112, e.g., by utilizing the power amplifiers coupled to each of the antennas, for transmission, which generally improves performance. Employing fewer than T transmit antennas 112 for transmission typically results in less than all of the available transmit power being used for the transmission, which would impact performance.

The selection of the transmission scheme can be based upon feedback as to information regarding the channel state information for the channel between base station 110 and terminal 120. The terminal 120 can report some or all of this information as channel quality information (CQI), which in one aspect can be one or more quantized values that indicate some parameter of the channel, in the case where MIMO or multiple transmission streams are involved.

The transmission schemes described herein can readily support MIMO, single-input multiple-output (SIMO), and single-input single-output (SISO) transmissions. A MIMO transmission is a transmission of multiple output symbols from multiple virtual antennas to multiple receive antennas on one subband in one symbol period. A SIMO transmission is a transmission of a single output symbol from one virtual antenna to multiple receive antennas on one subband in one symbol period. A SISO transmission is a transmission of a single output symbol from one virtual antenna to one receive antenna on one subband in one symbol period. The transmitter can also send a combination of MIMO, SIMO and/or SISO transmissions to one or more receivers in one symbol period.

The transmitter can transmit M output symbols simultaneously from the T transmit antennas 112 on one subband in one symbol period using various transmission schemes. In an embodiment, the transmitter processes the output symbols for transmission, as follows:

$$\underline{x}(k) = \underline{U} \cdot \underline{P}(k) \cdot \underline{s}(k), \quad \text{Eq (3)}$$

where $\underline{s}(k)$ is an M×1 vector containing M output symbols to be sent on subband k in one symbol period; $\underline{P}(k)$ is a V×M permutation matrix for subband k; $\underline{U} = [\underline{u}_1 \, \underline{u}_2 \ldots \underline{u}_v]$ is a T×V orthonormal matrix; and $\underline{x}(k)$ is a T×1 vector containing T transmit symbols to be sent from the T transmit antennas 112 on subband k in one symbol period. V is the number of virtual antennas formed with the orthonormal matrix $\underline{U}$. In general, $1 \leq M \leq V \leq T$. V can be a fixed value or a configurable value.

The orthonormal matrix $\underline{U}$ is characterized by the property $\underline{U}_H \cdot \underline{U} = \underline{I}$, where "$H$" denotes a conjugate transpose and $\underline{I}$ is the identity matrix. The V columns of $\underline{U}$ are orthogonal to one another, and each column has unit power. In an embodiment, $\underline{U}$ is defined such that the sum of the squared magnitude of the V entries in each row is equal to a constant value. This property results in all of the transmit power for each transmit antenna being used for transmission. $\underline{U}$ can also be a unitary matrix that is characterized by the property $\underline{U}^H \cdot \underline{U} = \underline{U} \cdot \underline{U}^H = \underline{I}$. Orthonormal and unitary matrices can be formed as described below. The V columns of $\underline{U}$ are used to form V virtual antennas that can be used to send up to V output symbols on one subband in one symbol period. The virtual antennas can also be called effective antennas or by some other terminology.

In an embodiment, a single orthonormal matrix $\underline{U}$ is used for all K total subbands in all symbol periods, so that $\underline{U}$ is not a function of subband index k or symbol index n. In another embodiment, different orthonormal matrices are used for different subband sets that can be assigned to different receivers. In yet another embodiment, different orthonormal matrices are used for different subbands. In yet another embodiment, different orthonormal matrices are used for different time intervals, where each time interval can span one or multiple symbol periods. In yet another embodiment, one or more orthonormal matrices are selected for use from among multiple orthonormal matrices, as described below. In general, data and pilot can be transmitted using one or more orthonormal matrices such that a receiver is able to estimate the channel response based on the pilot and use the channel response estimate to recover the data sent to the receiver.

The permutation matrix $\underline{P}(k)$ selects which M virtual antennas to use for subband k from among the V virtual antennas available for use, or which M of the V columns of $\underline{U}$. The permutation matrix $\underline{P}(k)$ can be defined in various manners, and different permutation matrices can be used for different subbands, as described below.

Figure 3:
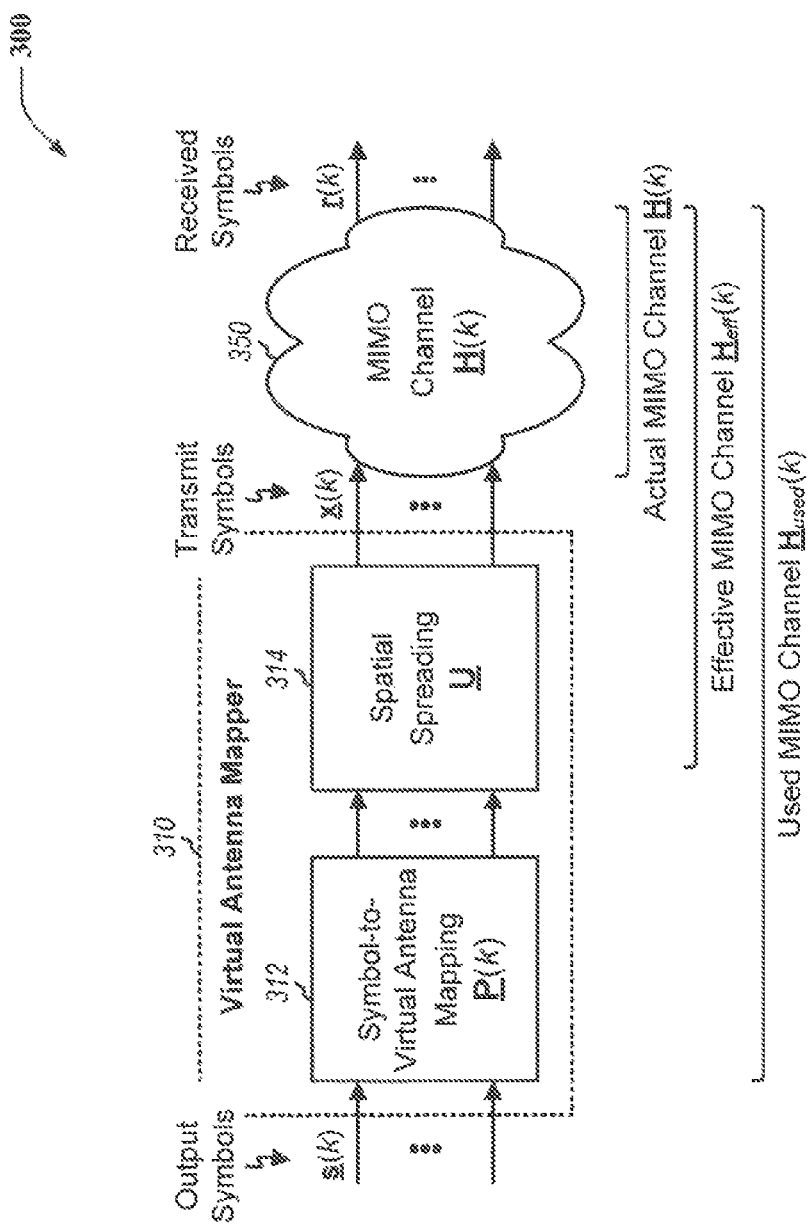
FIG. 3 is an illustration of an example model for a transmission scheme with virtual antennas.

FIG. 3 illustrates a model 300 for the transmission scheme given by equation (3). The transmitter receives the data vector $\underline{s}(k)$ for each subband and symbol period used for transmission. A virtual antenna mapper 310 processes the data vector $\underline{s}(k)$ and generates the transmit vector $\underline{x}(k)$. Within virtual antenna mapper 310, a symbol-to-virtual antenna mapping unit 312 multiplies the data vector $\underline{s}(k)$ with the permutation matrix $\underline{P}(k)$ and generates a V×1 intermediate vector. A spatial spreading unit 314 multiplies the intermediate vector with the orthonormal matrix $\underline{U}$ and generates the transmit vector $\underline{x}(k)$. The transmit vector $\underline{x}(k)$ is transmitted from the T transmit antennas and via a MIMO channel 350 to R receive antennas at a receiver.

The received symbols at the receiver can be expressed as:

$$\begin{aligned} \underline{r}(k) &= \underline{H}(k) \cdot \underline{x}(k) + \underline{n}(k), \quad \text{Eq (4)} \\ &= \underline{H}(k) \cdot \underline{U} \cdot \underline{P}(k) \cdot \underline{s}(k) + \underline{n}(k), \\ &= \underline{H}_{\it{eff}}(k) \cdot \underline{P}(k) \cdot \underline{s}(k) + \underline{n}(k), \\ &= \underline{H}_{used}(k) \cdot \underline{s}(k) + \underline{n}(k), \end{aligned}$$

where $\underline{r}(k)$ is an R×1 vector containing R received symbols from the R receive antennas on subband k in one symbol period; $\underline{H}_{\it{eff}}(k)$ is an R×V effective channel response matrix for subband k; $\underline{H}_{used}(k)$ is an R×M used channel response matrix for subband k; and $\underline{n}(k)$ is an R×1 noise vector for subband k.

The effective and used channel response matrices can be given as:

$$\begin{aligned} \underline{H}_{\it{eff}}(k) &= \underline{H}(k) \cdot \underline{U}, \quad \text{Eq (5)} \\ &= [\underline{H}(k) \cdot \underline{u}_1 \, \underline{H}(k) \cdot \underline{u}_2 \ldots \underline{H}(k) \cdot \underline{u}_v], \text{ and} \\ \underline{H}_{used}(k) &= \underline{H}_{\it{eff}}(k) \cdot \underline{P}(k), \quad \text{Eq (6)} \\ &= [\underline{H}(k) \cdot \underline{u}_{(1)} \, \underline{H}(k) \cdot \underline{u}_{(2)} \ldots \underline{H}(k) \cdot \underline{u}_{(M)}], \end{aligned}$$

where $\{\underline{u}_{(1)} \, \underline{u}_{(2)} \ldots \underline{u}_{(M)}\} \subset \{\underline{u}_1 \, \underline{u}_2 \ldots \underline{u}_V\}$ As shown in equation (3) and illustrated in FIG. 3, an effective MIMO channel with V virtual antennas is formed by the use of the orthonormal matrix U. Data is sent on all or a subset of the V virtual antennas. A used MIMO channel is formed by the M virtual antennas used for transmission.

For the transmission scheme described above, an R×T MIMO system is effectively reduced to an R×V MIMO system. The transmitter appears as if it has V virtual antennas rather than T transmit antennas, where V≤T. This transmission scheme decreases the channel estimation overhead order to C=V. However, the spatial multiplexing order is limited to V, or M≤V, and the spatial diversity order is also limited to V, or D≤V.

The description above is for one subband k. The transmitter can perform the same processing for each subband used for transmission. The frequency diversity of each virtual antenna across subbands is the same as the frequency diversity of the physical transmit antennas. However, the spatial diversity is reduced from T to V.

In another embodiment, the transmitter processes the output symbols for transmission, as follows:

$$\underline{\tilde{x}}(k) = \underline{D}(k) \cdot \underline{U} \cdot \underline{P}(k) \cdot \underline{s}(k), \quad \text{Eq (7)}$$

where $\underline{D}(k)$ is a T×T diagonal matrix for subband k. $\underline{D}(k)$ is used to achieve cyclic delay diversity, which improves the frequency selectivity of the virtual antennas and can improve spatial diversity order to somewhere between V and T. Cyclic delay diversity can be achieved in the time domain or the frequency domain.

Cyclic delay diversity can be achieved in the time domain by circularly shifting (or cyclically delaying) the sequence of K time-domain samples (obtained from the K-point IDFT or IFFT) for each transmit antenna i by a delay of $T_i$, for $i = 1, \ldots, T$. For example, $T_i$ can be defined as $T_i = (i-1) \cdot J$, where J can be equal to one sample period, a fraction of a sample period, or more than one sample period. J can be selected such that the channel impulse response for each virtual antenna is expected to be shorter than the cyclic prefix length. A cyclic delay of X samples can be achieved by moving the last X samples in the sequence of K time-domain samples to the front of the sequence. The time-domain samples for the T transmits antenna are cyclically delayed by different amounts. A cyclic prefix can be appended before or after applying the cyclic delay.

Cyclic delay diversity can also be achieved in the frequency domain by applying a phase ramp (or a progressive phase shift) across the K total subbands for each transmit antenna. T different phase ramps are used for the T transmit antennas to achieve K different cyclic delays for these antennas. The diagonal matrix $\underline{D}(k)$ for each subband k can be defined as follows:

$$\underline{D}(k) = \begin{bmatrix} 1 & 0 & \cdots & 0 \\ 0 & e^{j2\pi \cdot (k-1) \cdot J/T} & \cdots & 0 \\ \vdots & \vdots & \ddots & \vdots \\ 0 & 0 & \cdots & e^{j2\pi \cdot (k-1) \cdot (T-1) \cdot J/T} \end{bmatrix}, \quad \text{Eq (8)}$$

for $k = 1, \ldots, K$.

As indicated by equation (8), transmit antenna 1 has a phase slope of 0 across the K total subbands, transmit antenna 2 has a phase slope of $2\pi \cdot J/T$ across the K total subbands, and so on, and transmit antenna T has a phase slope of $2\pi \cdot (T-1)J/T$ across the K total subbands. The diagonal matrix $\underline{D}(k)$ and the orthonormal matrix $\underline{U}$ can also be combined to obtain a new orthonormal matrix $\underline{U}(k)=\underline{D}(k)\,\underline{U}$, where $\underline{U}(k)$ can be applied to the data vector $\underline{s}(k)$.

The received symbols with cyclic delay diversity can be expressed as:

$$\begin{aligned}\tilde{r}(k) &= \underline{H}(k) \cdot \tilde{x}(k) + \underline{n}(k), \\ &= \underline{H}(k) \cdot \underline{D}(k) \cdot \underline{U} \cdot \underline{P}(k) \cdot \underline{s}(k) + \underline{n}(k), \\ &= \tilde{\underline{H}}_{\mathit{eff}}(k) \cdot \underline{P}(k) \cdot \underline{s}(k) + \underline{n}(k), \\ &= \tilde{\underline{H}}_{\mathit{used}}(k) \cdot s(k) + \underline{n}(k),\end{aligned} \quad \text{Eq (9)}$$

where $\tilde{r}(k)$ is an R×1 received vector with cyclic delay diversity; $\tilde{\underline{H}}_{\mathit{eff}}(k)$ is an R×V effective channel response matrix with cyclic delay diversity; and $\tilde{\underline{H}}_{\mathit{used}}(k)$ is an R×M used channel response matrix with cyclic delay diversity.

The effective and used channel response matrices can be given as:

$$\begin{aligned}\tilde{H}_{\mathit{eff}}(k) &= \underline{H}(k) \cdot \underline{D}(k) \cdot \underline{U}, \\ &= [\underline{H}(k) \cdot \underline{D}(k) \cdot \underline{u}_1 \ \underline{H}(k) \cdot \underline{D}(k) \cdot \underline{u}_2 \ \ldots \ \underline{H}(k) \cdot \underline{D}(k) \cdot \underline{u}_V],\end{aligned} \quad \text{Eq (10)}$$

and $$\begin{aligned}\tilde{H}_{\mathit{used}}(k) &= \tilde{H}_{\mathit{eff}}(k) \cdot \underline{P}(k), \\ &= [\underline{H}(k) \cdot \underline{D}(k) \cdot \underline{u}_{(1)} \ \underline{H}(k) \cdot \underline{D}(k) \cdot \underline{u}_{(2)} \ \ldots \ \underline{H}(k) \cdot \underline{D}(k) \cdot \underline{u}_{(M)}].\end{aligned} \quad \text{Eq (11)}$$

Figure 4:
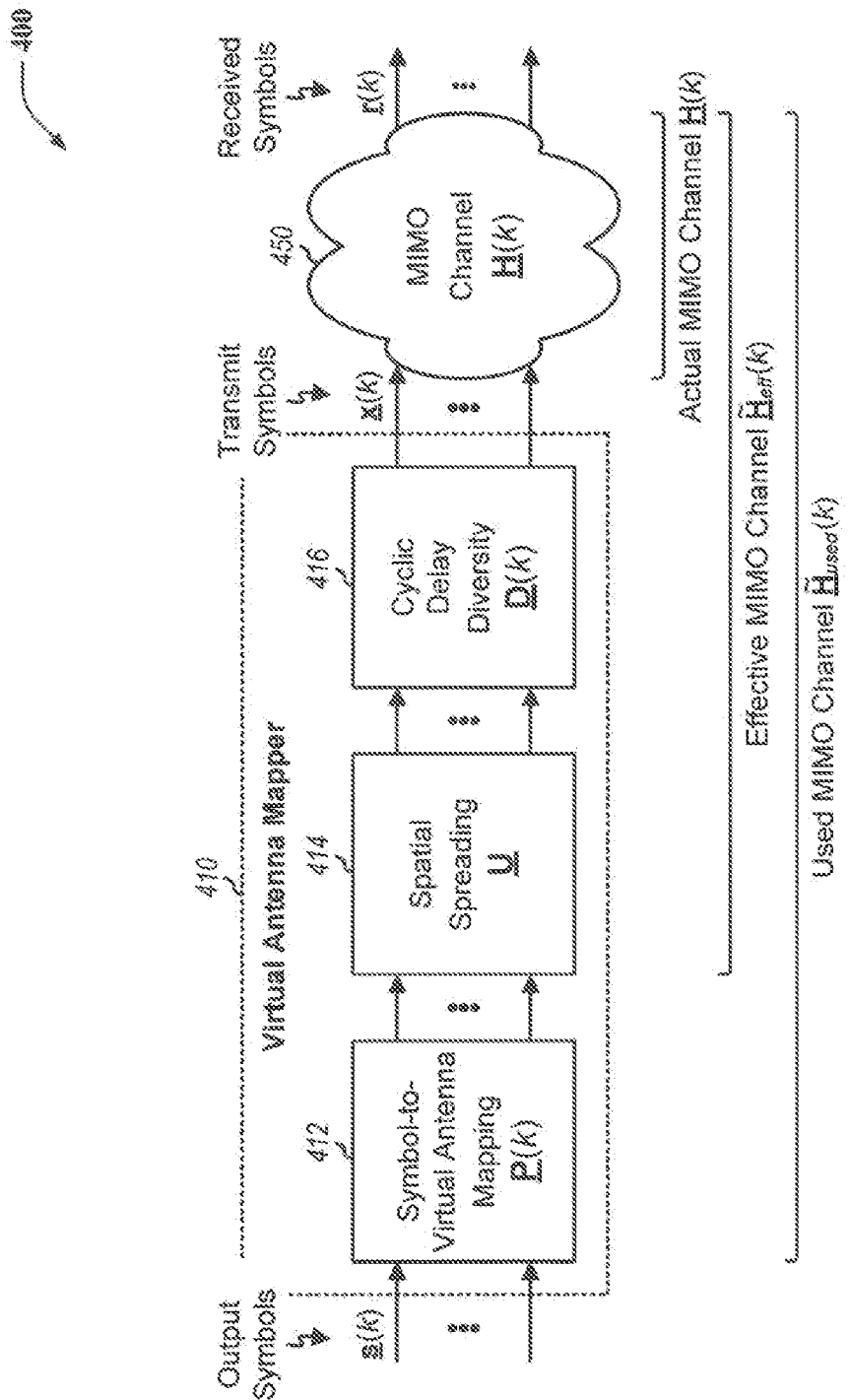
FIG. 4 is an illustration of an example model for a transmission scheme with virtual antennas and cyclic delay diversity.

FIG. 4 illustrates a model 400 for the transmission scheme given by equation (7). Within a virtual antenna mapper 410, a symbol-to-virtual antenna mapping unit 412 multiplies the data vector $\underline{s}(k)$ with the permutation matrix $\underline{P}(k)$ and generates a V×1 vector. A spatial spreading unit 414 multiplies the V×1 vector with the orthonormal matrix $\underline{U}$ and generates a T×1 vector. A cyclic delay diversity unit 416 multiplies the T×1 vector with the diagonal matrix $\underline{D}(k)$ and generates the T×1 transmit vector $\underline{x}(k)$. The transmit vector $\underline{x}(k)$ is transmitted from the T transmit antennas and via a MIMO channel 450 to R receive antennas at a receiver.

As shown in equation (7) and illustrated in FIG. 4, an effective MIMO channel $\tilde{\underline{H}}_{\mathit{eff}}(k)$ with V virtual antennas is formed by the use of the orthonormal matrix $\underline{U}$ and cyclic delay diversity. A used MIMO channel $\tilde{\underline{H}}_{\mathit{used}}(k)$ is formed by the M virtual antennas used for transmission.

Equations (3) and (7) assume that equal transmit power is used for the M output symbols being sent simultaneously on one subband in one symbol period. In general, the transmit power available for each transmit antenna can be uniformly or non-uniformly distributed across the subbands used for transmission. The transmit powers available for the T transmit antennas for each subband can be uniformly or non-uniformly distributed to the M output symbols being sent on that subband. Different transmit powers can be used for the M output symbols by scaling the data vector $\underline{s}(k)$ with a diagonal gain matrix $\underline{G}$ as follows: $\underline{x}(k)=\underline{U}\cdot\underline{P}(k)\cdot\underline{G}\cdot\underline{s}(k)$ or $\tilde{\underline{x}}(k)=\underline{D}(k)\cdot\underline{U}\cdot\underline{P}(k)\cdot\underline{G}\cdot\underline{s}(k)$, where diag $\{\underline{G}\}=\{g_1\ g_2\ \ldots\ g_M\}$ and $g_i$ is the gain for output symbol $s_i$.

Various types of matrices can be used to form the orthonormal matrix $\underline{U}$. For example, $\underline{U}$ may be formed based on a Fourier matrix, a Walsh matrix, or some other matrix. A T×T Fourier matrix $\underline{F}_{T\times T}$ has element $f_{n,m}$ in the n-th row of the m-th column, which can be expressed as:

$$f_{n,m} = e^{-j2\pi \frac{(n-1)(m-1)}{T}}, \quad \text{Eq (12)}$$

for $n = 1, \ldots, T$ and $m = 1, \ldots, T$.

Fourier matrices of any square dimension (e.g., 2, 3, 4, 5, 6, and so on) can be formed. A 2×2 Walsh matrix $\underline{W}_{2\times 2}$ and larger size Walsh matrix $\underline{W}_{2N\times 2N}$ can be expressed as:

$$\underline{W}_{2\times 2} = \begin{bmatrix} 1 & 1 \\ 1 & -1 \end{bmatrix} \text{ and } \underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}. \quad \text{Eq (13)}$$

In an embodiment, the orthonormal matrix $\underline{U}$ is equal to a matrix containing V columns of a T×T Fourier matrix or a T×T Walsh matrix. In another embodiment, $\underline{U}$ is formed as follows:

$$\underline{U} = \underline{\Lambda} \cdot \underline{F}, \quad \text{Eq (14)}$$

where $\underline{F}$ is a T×V matrix containing the first V columns of the T×T Fourier matrix; and $\underline{\Lambda}$ is a T×T diagonal matrix containing T scaling values for the T rows of $\underline{F}$. For example, the diagonal matrix $\underline{\Lambda}$ can be defined as $\underline{\Lambda}=\text{diag}\,\{1\ e^{j\theta_1}\ \ldots\ e^{j\theta_T}\}$, where $\theta_i$ for $i=1,\ldots,T$ may be random phases. In yet another embodiment, $\underline{U}$ is an orthonormal matrix with pseudo-random elements, e.g. having unit magnitude and pseudo-random phases.

The transmitter can send a MIMO, SIMO or SISO transmission to a receiver on a set of subbands, which are called the assigned subbands. The K total subbands can be partitioned into multiple non-overlapping subband sets. In this case, the transmitter can transmit to multiple receivers simultaneously on multiple subband sets. The transmitter can send the same or different types of transmission to these multiple receivers. For example, the transmitter can send a MIMO transmission on a first subband set to a first receiver, a SIMO transmission on a second subband set to a second receiver, a SISO transmission on a third subband set to a third receiver, and so on.

A SIMO or SISO transmission can be sent from a single virtual antenna formed with a single column of the orthonormal matrix $\underline{U}$. In this case, M=V=1, and the effective MIMO channel becomes an R×1 SISO or SIMO channel having a channel response vector of $\underline{h}_{\mathit{eff}}(k)=\underline{H}(k)\cdot\underline{u}_1$ or $\underline{\tilde{h}}_{\mathit{eff}}(k)=\underline{H}(k)\cdot\underline{D}(k)\cdot\underline{u}_1$. The data vector $\underline{s}(k)$ becomes a 1×1 vector containing a single output symbol, the permutation matrix $\underline{P}(k)$ becomes a 1×1 matrix containing a single '1', and the orthonormal matrix $\underline{U}$ becomes a T×1 matrix containing a single column.

A MIMO transmission can be sent from multiple virtual antennas formed with multiple columns of the orthonormal matrix $\underline{U}$. If the number of output symbols is less than the number of virtual antennas (or M<S), then M virtual antennas can be selected for use in various manners.

Figure 5:
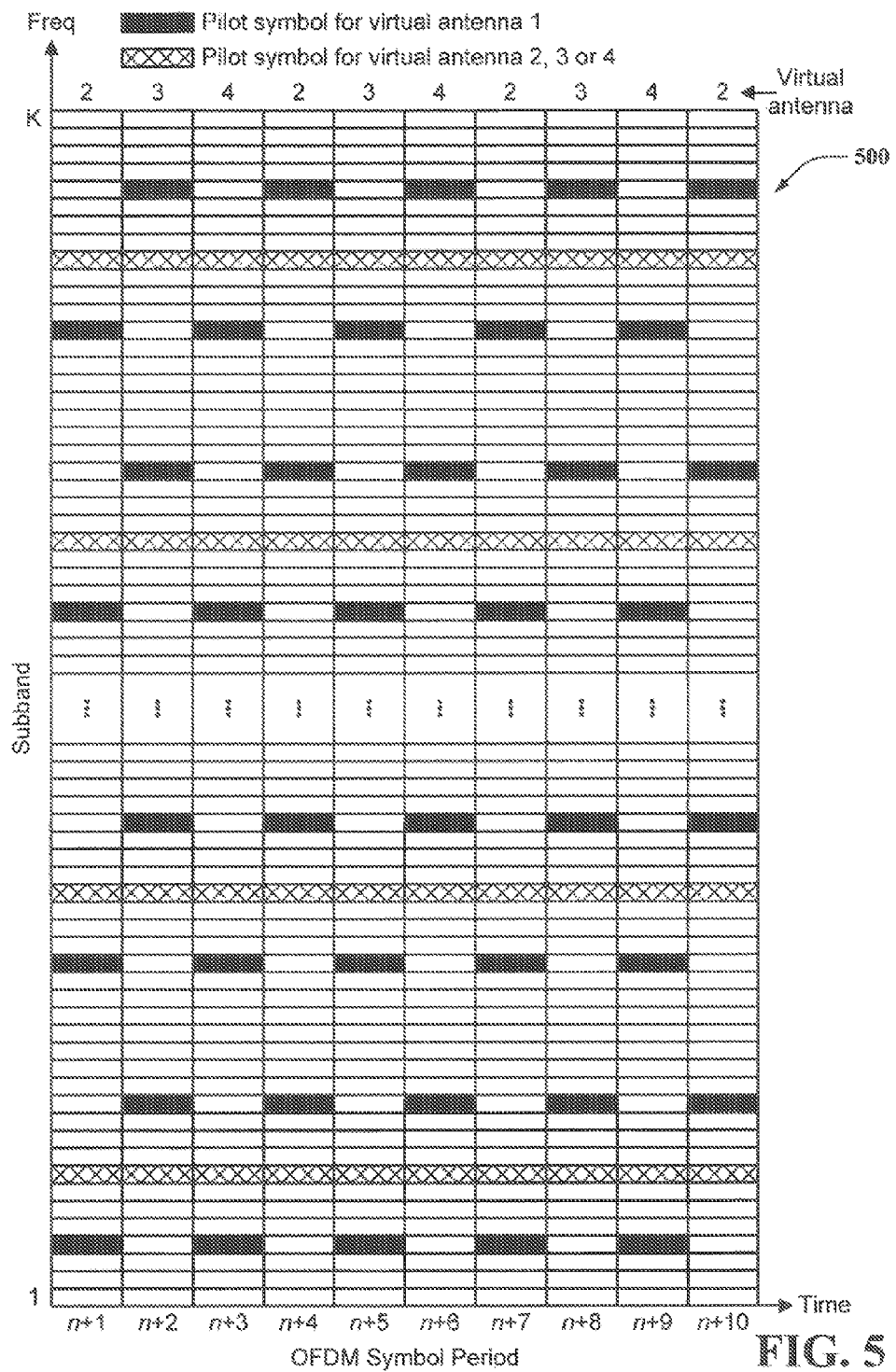
FIG. 5 is an illustration of an example pilot scheme for symbol rate hopping.

FIG. 5 depicts an exemplary pilot scheme 500 for symbol rate hopping. For pilot scheme 500, the transmitter transmits a common pilot on one interlace from virtual antenna 1 in each symbol period. The transmitter can transmit the common pilot on different interlaces in different symbol periods, as shown in FIG. 5. Such a staggered pilot allows a receiver to sample the frequency spectrum on more subbands and to derive a longer channel impulse response estimate. The transmitter can also transmit an auxiliary pilot on one or more interlaces from the remaining virtual antennas to allow MIMO receivers to estimate the channel response for all virtual antennas used for transmission. For the embodiment shown in scheme 500, the transmitter transmits the auxiliary pilot on one interlace in each symbol period and cycles through virtual antennas 2 through V in V−1 different symbol periods. For the case with V=4 as shown in scheme 500, the transmitter transmits the auxiliary pilot from virtual antenna 2 in symbol period n+1, then from virtual antenna 3 in symbol period n+2, then from virtual antenna 4 in symbol period n+3, then from virtual antenna 2 in symbol period n+4, and so on.

The transmitter can transmit the common pilot for MIMO, SIMO and SISO receivers and can transmit the auxiliary pilot only when MIMO receivers are present. The MIMO, SIMO and SISO receivers can use the common pilot to derive a channel estimate for the K total subbands of virtual antenna 1. A MIMO receiver can use the auxiliary pilot to derive channel estimates for virtual antennas 2 through V.

Figure 6A:
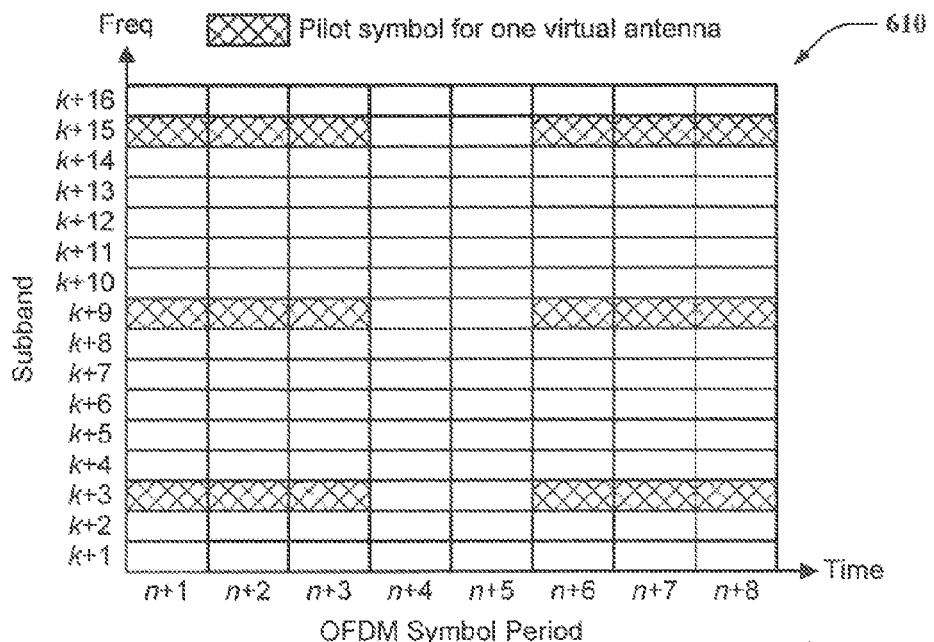
FIGS. 6A-6D are illustrations of example pilot schemes for block hopping.

FIG. 6A illustrates an exemplary pilot scheme 610 for block hopping. For the embodiment shown in scheme 610, a time-frequency block is composed of 16 adjacent subbands k+1 through k+16 and further spans 8 symbol periods n+1 through n+8. For pilot scheme 610, the transmitter transmits a dedicated pilot on subbands k+3, k+9 and k+15 in each of symbol periods n+1 through n+3 and n+6 through n+8, or six strips of three pilot symbols. Each pilot symbol can be sent from any virtual antenna. For example, if V=3, then the transmitter can transmit the pilot from virtual antenna 1 in symbol periods n+1 and n+6, from virtual antenna 2 in symbol periods n+2 and n+7, and from virtual antenna 3 in symbol periods n+3 and n+8.

Figure 6B:
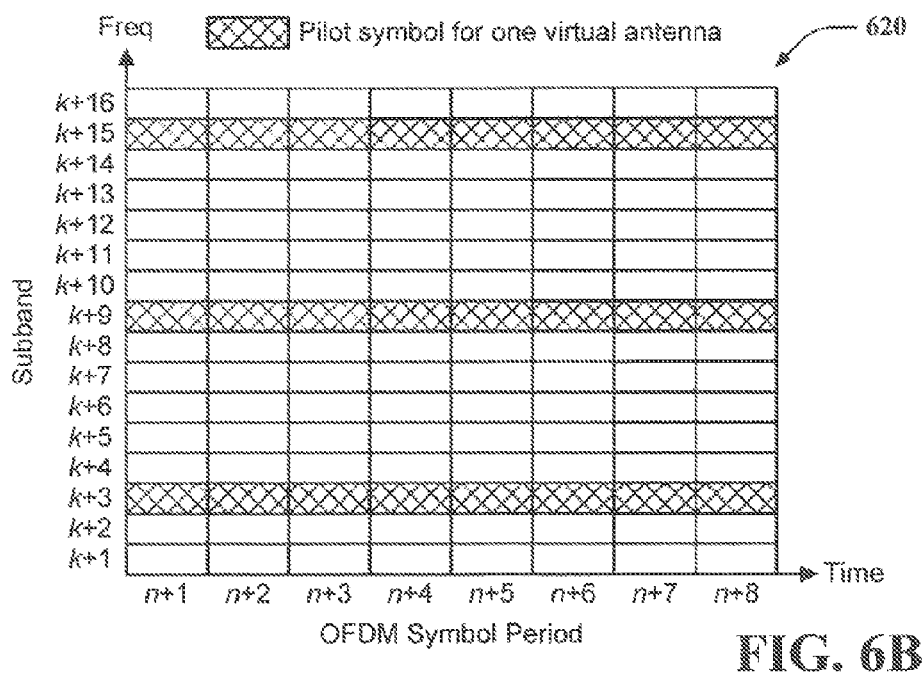

FIG. 6B depicts an exemplary pilot scheme 620 for block hopping. For pilot scheme 620, the transmitter transmits a dedicated pilot on subbands k+3, k+9 and k+15 in each of symbol periods n+1 through n+8, or three strips of eight pilot symbols. Each pilot symbol can be sent from any virtual antenna. For example, if V=4, then the transmitter can transmit the pilot from virtual antenna 1 in symbol periods n+1 and n+5, from virtual antenna 2 in symbol periods n+2 and n+6, from virtual antenna 3 in symbol periods n+3 and n+7, and from virtual antenna 4 in symbol periods n+4 and n+8.

Figure 6C:
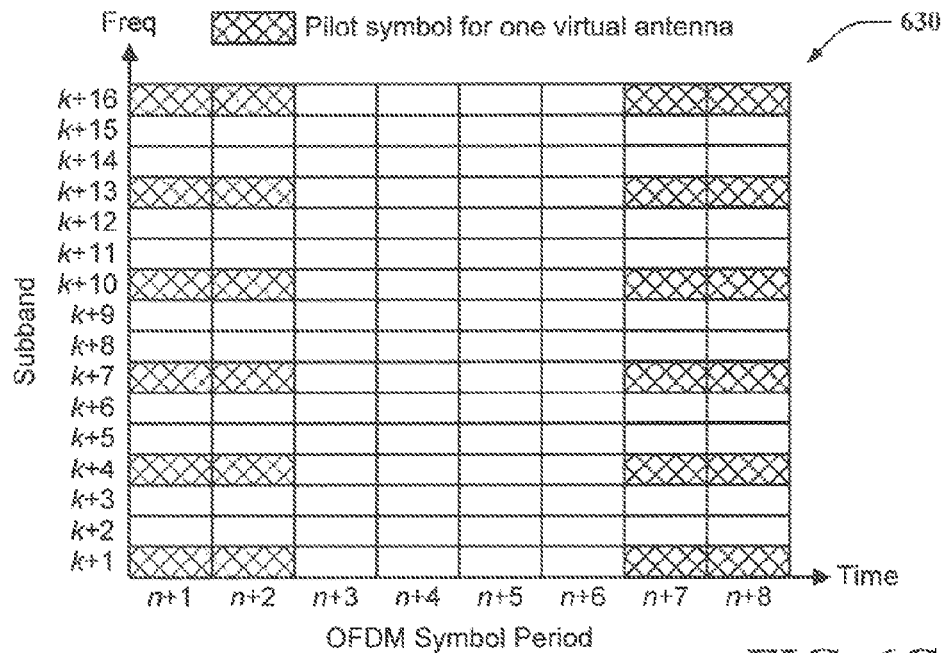

FIG. 6C illustrates an exemplary pilot scheme 630 for block hopping. For pilot scheme 630, the transmitter transmits a dedicated pilot on subbands k+1, k+4, k+7, k+10, k+13 and k+16 in each of symbol periods n+1, n+2, n+7 and n+8. Each pilot symbol can be sent from any virtual antenna. For example, the transmitter can transmit the pilot from virtual antenna 1 in symbol period n+1, from virtual antenna 2 in symbol period n+2, from virtual antenna 1 or 3 in symbol period n+7, and from virtual antenna 2 or 4 in symbol period n+8.

Figure 6D:
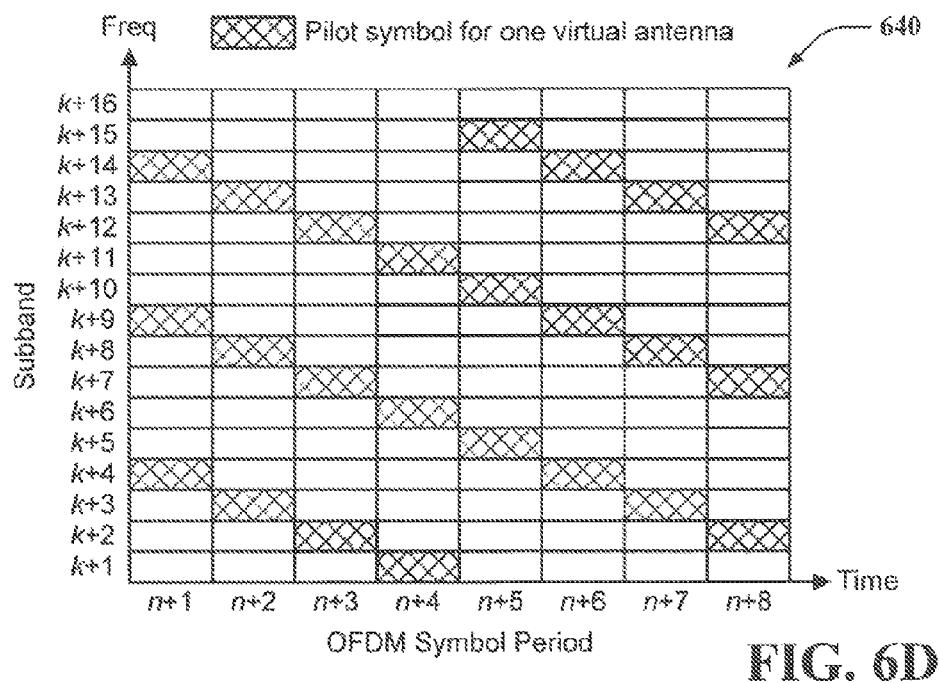

FIG. 6D depicts an exemplary pilot scheme 640 for block hopping. For pilot scheme 640, the transmitter transmits a staggered pilot on three subbands in each symbol period and on different pilot subbands in different symbol periods. Each pilot symbol can be sent from any virtual antenna. For example, the transmitter can transmit the pilot from a different virtual antenna in each symbol period and can cycle through the V virtual antennas in V symbol periods.

In general, for the block hopping scheme, the transmitter can transmit a pilot in each time-frequency block such that a receiver is able to derive a channel estimate for each virtual antenna used for transmission. FIGS. 6A through 6D show four exemplary pilot patterns that can be used. Other pilot patterns can also be defined and used for pilot transmission.

For both symbol rate hopping and block hopping, the transmitter can transmit the pilot from any number of virtual antennas, can use any number of pilot subbands for each virtual antenna, and can use any amount of transmit power for each virtual antenna. If the pilot is sent from multiple virtual antennas, then the transmitter can use the same or different numbers of subbands for these virtual antennas and can transmit the pilot at the same or different power levels for the virtual antennas. The transmitter may or may not stagger the pilot for each virtual antenna. The transmitter can transmit the pilot on more subbands to allow a receiver to obtain more "look" of the wireless channel in the frequency domain and to derive a longer channel impulse response estimate. The transmitter can transmit the pilot on all pilot subbands from one virtual antenna in each symbol period, as described above. Alternatively, the transmitter can transmit the pilot from multiple virtual antennas on multiple subsets of subbands in a given symbol period.

Figure 7:
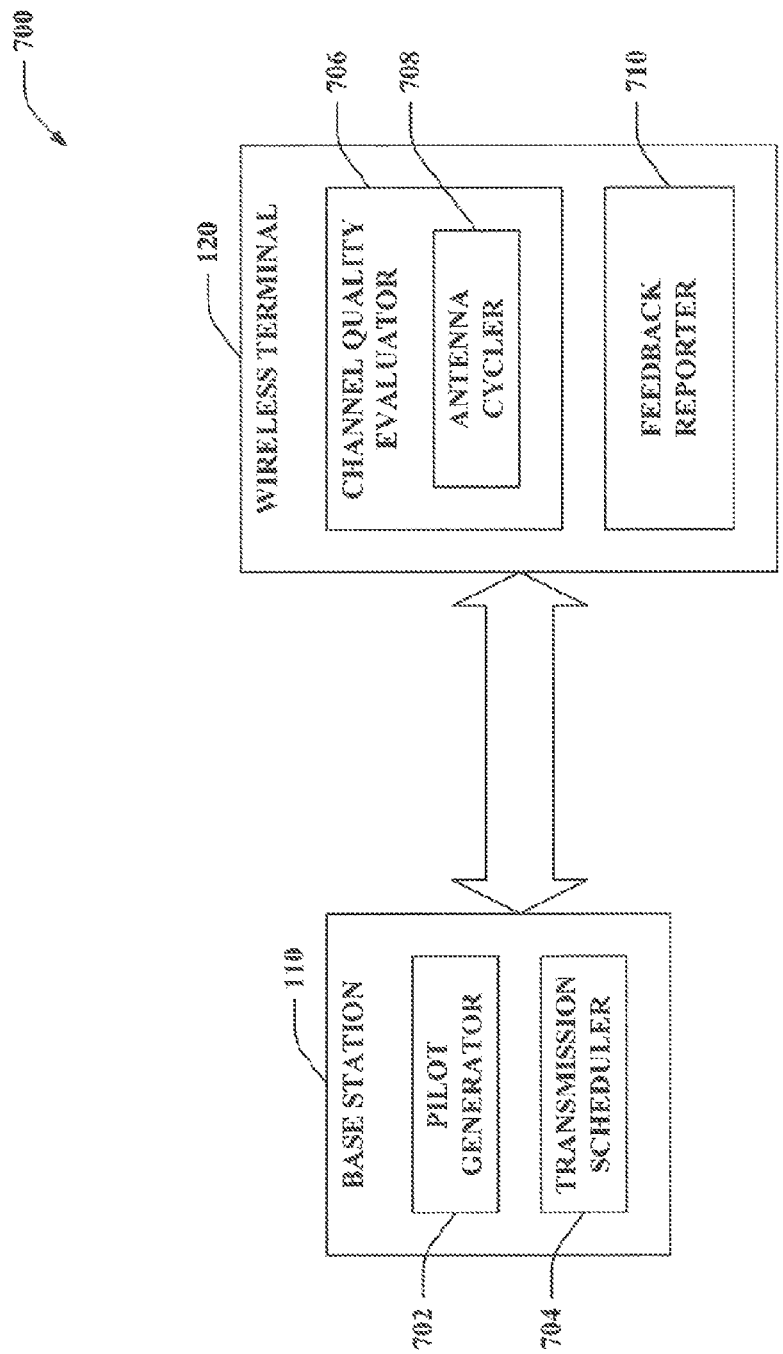
FIG. 7 is an illustration of an example system that cycles across antennas for CQI computation and data transmission in a MIMO wireless communication environment.

Turning to FIG. 7, illustrated is a system 700 that cycles across antennas for CQI computation and data transmission in a MIMO wireless communication environment. System 700 includes a base station 110 that communicates with a wireless terminal 120 via a MIMO channel as described herein. Base station 110 further includes a pilot generator 702 that yields pilot(s) that can be transmitted over a downlink to wireless terminal 120 (and/or any number of disparate wireless terminal(s) (not shown)). Further, base station 110 can include a transmission scheduler 704 that obtains feedback (e.g., CQI(s)) from wireless terminal 120 and schedules data transmission.

Wireless terminal 120 includes a channel quality evaluator 706 that obtains and analyzes the pilot(s) communicated from base station 110 (and/or pilot(s) received from any number of disparate base station(s) (not shown)). Pursuant to an illustration, channel quality evaluator 706 can compute CQI based upon an analysis of the pilot(s). The CQI can provide feedback related to channel quality seen on the forward link; this feedback can be communicated via the reverse link to base station 110 as described below. Channel quality evaluator 706 can include an antenna cycler 708 that enables cycling across antennas. Accordingly, channel quality evaluator 706 can leverage antenna cycler 708 to determine CQIs for individual antennas. Further, channel quality evaluator 706 and antenna cycler 708 can identify stream(s) that can be supported by wireless terminal 120 (e.g., based upon an analysis of respective signal power ratios for the streams). Moreover, wireless terminal 120 can include a feedback reporter 710 that transfers feedback to base station 110 pertaining to the individual antennas. For instance, feedback reporter 710 can send a set of CQIs to base station 110, where each CQI pertains to an individual antenna.

In contrast, conventional techniques oftentimes compute an average CQI for a plurality of antennas; thus, regardless of the number of streams transmitted, an average CQI is computed. According to an example where such a typical system is employed, a user with a first antenna that has a good CQI and a second antenna that has a bad CQI may fail to be served since the average CQI reported to a base station utilized to effectuate scheduling decisions is decreased due to the poor CQI associated with the second antenna; rather, a disparate user with a higher average CQI can be scheduled. On the other hand, utilization of system 700 could allow for such a user to be served by utilizing the first antenna with the good CQI.

According to an example, pilot generator 702 can enable the transmitter to transmit the pilot(s) from the virtual antennas as described above for FIGS. 5 through 6D. According to another illustration, pilot generator 702 can enable the transmitter to transmit the pilot(s) from the physical antennas without applying the orthonormal matrix $\underline{U}$ or the permutation matrix $\underline{P}(k)$. For this embodiment, channel quality evaluator 706 of a receiver can estimate the actual channel response based on the pilot and can then derive an effective channel response estimate based on the actual channel response estimate and the orthonormal and permutation matrices.

Pursuant to various aspects, for symbol rate hopping, pilots are transmitted on the virtual antennas (e.g., as described with respect to FIG. 5) or by using common pilots on all of the virtual antennas for all interlaces or otherwise. Channel quality evaluator 706 and antenna cycler 708 can determine M non null CQIs for the number of layers that can be supported by the channel as determined based upon a rate table or other metric. Each CQI can be computed by cycling through the first M virtual antennas (e.g., with antenna cycler 708). Further, feedback reporter 710 can report the M non null CQIs to base station 110 along with $N_t$–M null CQIs for the rest of the layers.

Transmission scheduler 704 can schedule data transmission based upon fairness, channel quality (e.g., as reported by terminals via computed CQIs), and/or other scheduling criteria. Thus, transmission scheduler 704 enables base station 110 to select a user to be scheduled. If the user chosen by transmission scheduler 704 is a MIMO terminal, data is transmitted in a substantially similar fashion as compared to how CQI is computed; namely, the data is cycled across the M virtual antennas. This allows for exploiting multi-user diversity (MUD) gains, which can be beneficial for slowly varying channels.

According to an example where base station 110 decides to transmit a number of layers M'<M or M'>M, the CQI reports are no longer accurate as the data would be averaged over M' virtual antennas as opposed to M virtual antennas. In such a case, the power level of the CQI can be adjusted by M/M'.

By way of another example, system 700 can employ a block hopping mode. Accordingly, pilot generator 702 can enable the CQI pilots to be transmitted over virtual antennas (e.g., utilizing a slowly varying unitary matrix $U_{N_t \times N_t}$). At wireless terminal 120, CQI computation is done (e.g., by channel quality evaluator 706) over the used virtual antennas and over the whole band similar to described above with respect to symbol rate hopping mode. Data is also transmitted over the same set of used virtual antennas by exciting the same M columns of $U_{N_t \times N_t}$ on each tile (e.g., block). Thus, it can be possible that the CQI and data experience substantially similar channel and MUD gains. In addition, due to dedicated pilots in each tile, transmission scheduler 704 can change the transmission to be on different virtual antennas for different tiles; as such, diversity can be exploited and transmission reliability can be enhanced (e.g., with fast varying channels when CQI reports lack accuracy).

During data transmission, different layers can be cycled over the virtual antennas used in a tile. Moreover, if base station 110 changes the number of layers, power adjustment can be effectuated in a manner similar to the above discussion with regards to the symbol rate hopping mode. Moreover, for both symbol rate hopping mode and block hopping mode, a control channel CQI can be computed by channel quality evaluator 706 based upon a first virtual antenna response; however, it is to be appreciated that the response of multiple virtual antennas can be leveraged for determining the control channel CQI.

For the closed loop MIMO users, transmission can occur within system 700 using either precoding matrices (or vectors) or space diversity multiple access (SDMA) techniques. For instance, $U_{N_t \times N_t}$ can be known and employed to generate the virtual antenna permutation at wireless terminal 120. Thus, the permutation effect on the CQI pilots can be determined, which can be utilized to obtain an estimate of the physical antenna (PA) channels. The physical antenna channel estimate can be employed to decipher the optimal precoding matrix and the corresponding CQI. Wireless terminal 120 chooses the precoding matrix $V_{N_t \times M}$ that maximizes the capacity (e.g., the selected precoding matrix optimizes capacity) and feeds back an index of the chosen precoding matrix (e.g., via feedback reporter 710). The CQI is computed by channel quality evaluator 706 assuming cycling over the M virtual antennas (e.g., via employing antenna cycler 708).

During data transmission, for block hopping, a same $V_{N_t \times M}$ is used over all tiles and layers are cycled across the M virtual antennas. For symbol rate hopping, wireless terminal 120 can estimate the channel on the physical antennas (e.g., by undoing the effect of $U_{N_t \times N_t}$). Thereafter, wireless terminal 120 can apply the precoding matrix $V_{N_t \times M}$ to the estimates. The data can also be transmitted using $V_{N_t \times M}$ across all tones of the symbol rate hopping assignment. Note that in symbol rate hopping, the channel estimates do not enjoy the precoding gain seen on data. In addition, a mismatch between the precoding matrix used by wireless terminal 120 to color the channel estimates and that used by base station 110 for data transmission can occur when the precoding index is incorrectly interpreted.

Figure 8:
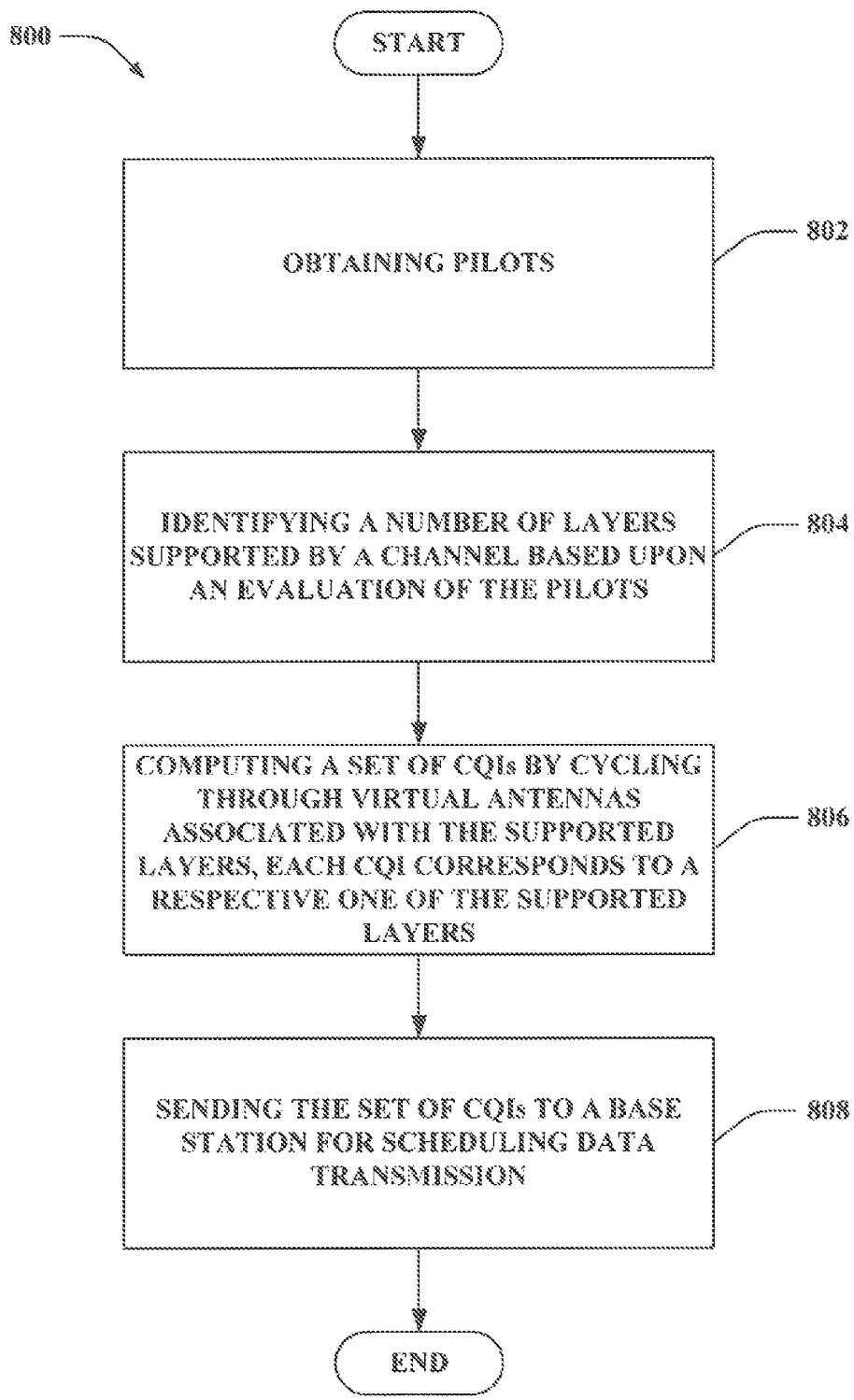
FIG. 8 is an illustration of an example methodology that facilitates evaluating CQI in a MIMO wireless communication environment.
Figure 9:
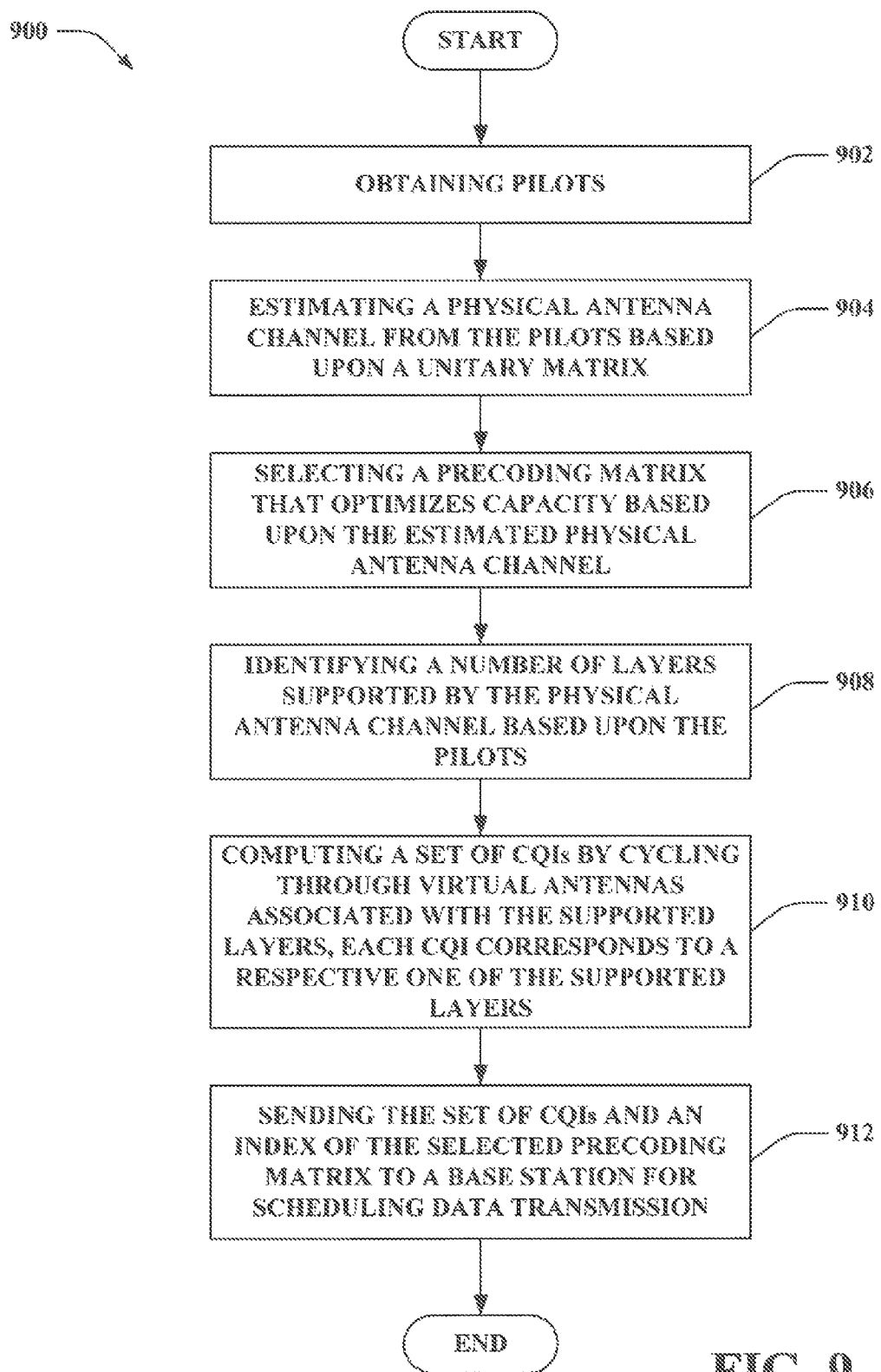
FIG. 9 is an illustration of an example methodology that facilitates computing CQI in a closed loop MIMO wireless communication environment.
Figure 10:
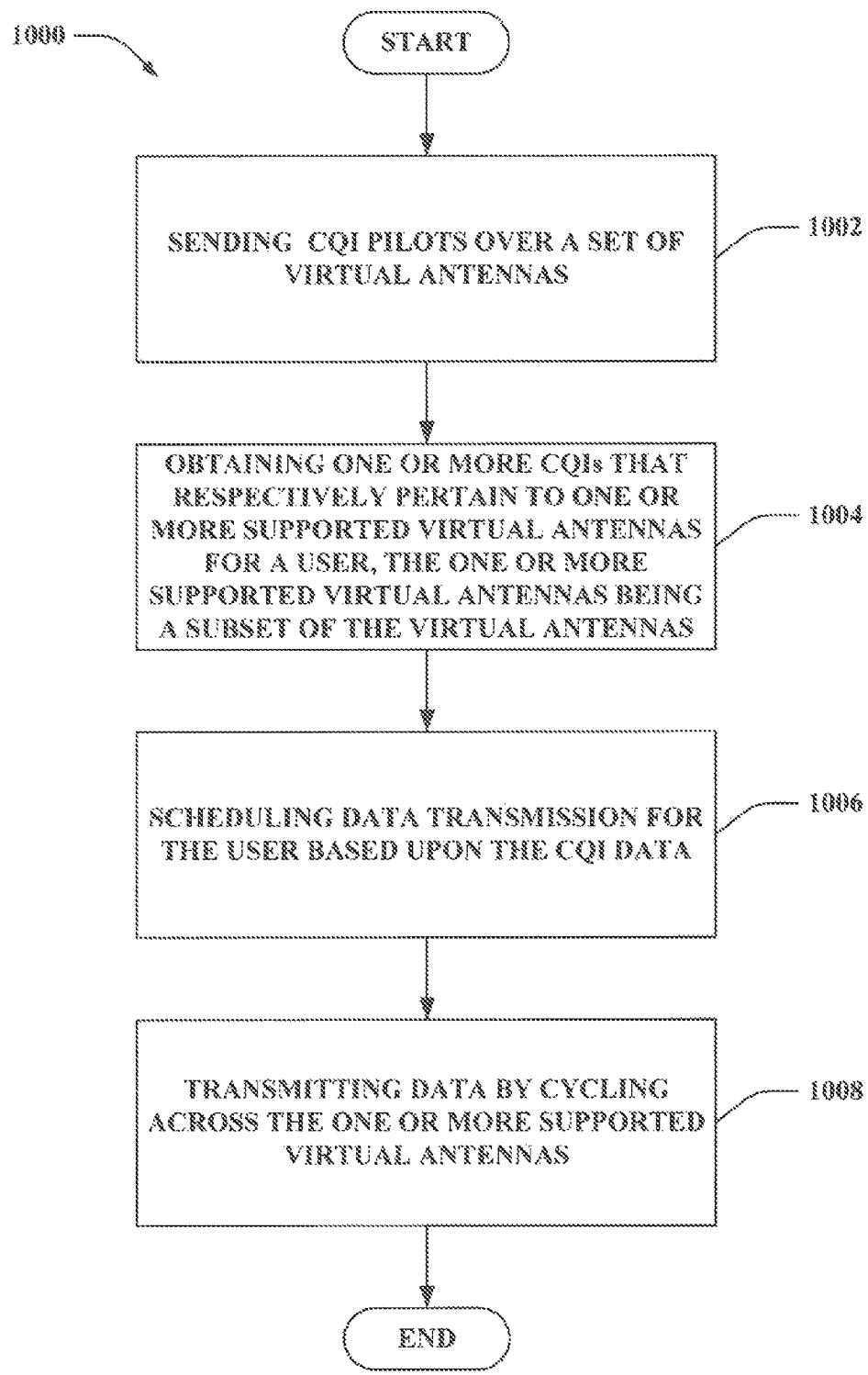
FIG. 10 is an illustration of an example methodology that facilitates transmitting data from a base station in a MIMO wireless communication environment.

Referring to FIGS. 8-10, methodologies relating to spatial cycling across antennas for CQI computation and data transmission in a MIMO wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 8, illustrated is a methodology 800 that facilitates evaluating CQI in a MIMO wireless communication environment. It is contemplated that the MIMO wireless communication environment can employ open loop MIMO and/or closed loop MIMO. Further, a symbol rate hopping mode and/or a block hopping mode can be utilized in the MIMO wireless communication environment. At 802, pilots can be obtained. For instance, pilots can be transmitted by a base station upon all virtual antennas. At 804, a number of layers supported by a channel can be identified based upon an evaluation of the pilots. By way of illustration, M layers can be determined to be supported by the channel (e.g., by analyzing signal power ratios related to the layers). At 806, a set of CQIs can be computed by cycling through virtual antennas associated with the supported layers, where each CQI corresponds to a respective one of the supported layers. Thus, M CQIs can be determined, for instance. At 808, the set of CQIs can be sent to a base station for scheduling data transmission. Accordingly, CQIs that individually correspond to supported virtual antennas can be provided as feedback rather than an average CQI of a plurality of virtual antennas. Moreover, data can be received from the base station, where the base station transmits the data on the same virtual antennas used for CQI computation; as such, data transmission by the base station can cycle over these virtual antennas for diversity.

Turning to FIG. 9, illustrated is a methodology that facilitates computing CQI in a closed loop MIMO wireless communication environment. At 902, pilots can be obtained. At 904, a physical antenna channel can be estimated from the pilots based upon a unitary matrix. The unitary matrix, for instance, can be substantially similar to a unitary matrix employed by a base station that generated and/or communicated the pilots. Moreover, the unitary matrix can be slowly varying (e.g., time varying unitary matrix). At 906, a precoding matrix can be selected that optimizes capacity based upon the estimated physical antenna channel. Further, an index related to the selected precoding matrix can be determined. At 908, a number of layers supported by the physical antenna channel can be identified based upon the pilots. At 910, a set of CQIs can be computed by cycling through virtual antennas associated with the supported layers, where each CQI corresponds to a respective one of the supported layers. At 912, the set of CQIs and an index of the selected precoding matrix can be sent to a base station for scheduling data transmission.

Now referring to FIG. 10, illustrated is a methodology that facilitates transmitting data from a base station in a MIMO wireless communication environment. At 1002, CQI pilots can be sent over a set of virtual antennas. For instance, the CQI pilots can be defined by a slowly varying unitary matrix. At 1004, one or more CQIs can be obtained that respectively pertain to one or more supported virtual antennas for a user, where the one or more supported virtual antennas can be a subset of the virtual antennas. Further, null CQIs can be obtained that correspond to the remainder of the virtual antennas in the set, for example. Moreover, CQIs from any number of disparate users can also be obtained. At 1006, data transmission can be scheduled for the user based upon the CQI data. By way of illustration, scheduling can be effectuated based upon fairness and/or channel quality considerations. At 1008, data can be transmitted by cycling across the one or more supported virtual antennas.

It will be appreciated that, in accordance with one or more aspects described herein, inferences can be made regarding spatial cycling across antennas. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting which layers are supported by a channel. By way of further illustration, an inference can be made related to determining which precoding matrix to employ to optimize capacity. It will be appreciated that the foregoing examples are illustrative in nature and are not intended to limit the number of inferences that can be made or the manner in which such inferences are made in conjunction with the various embodiments and/or methods described herein.

Figure 11:
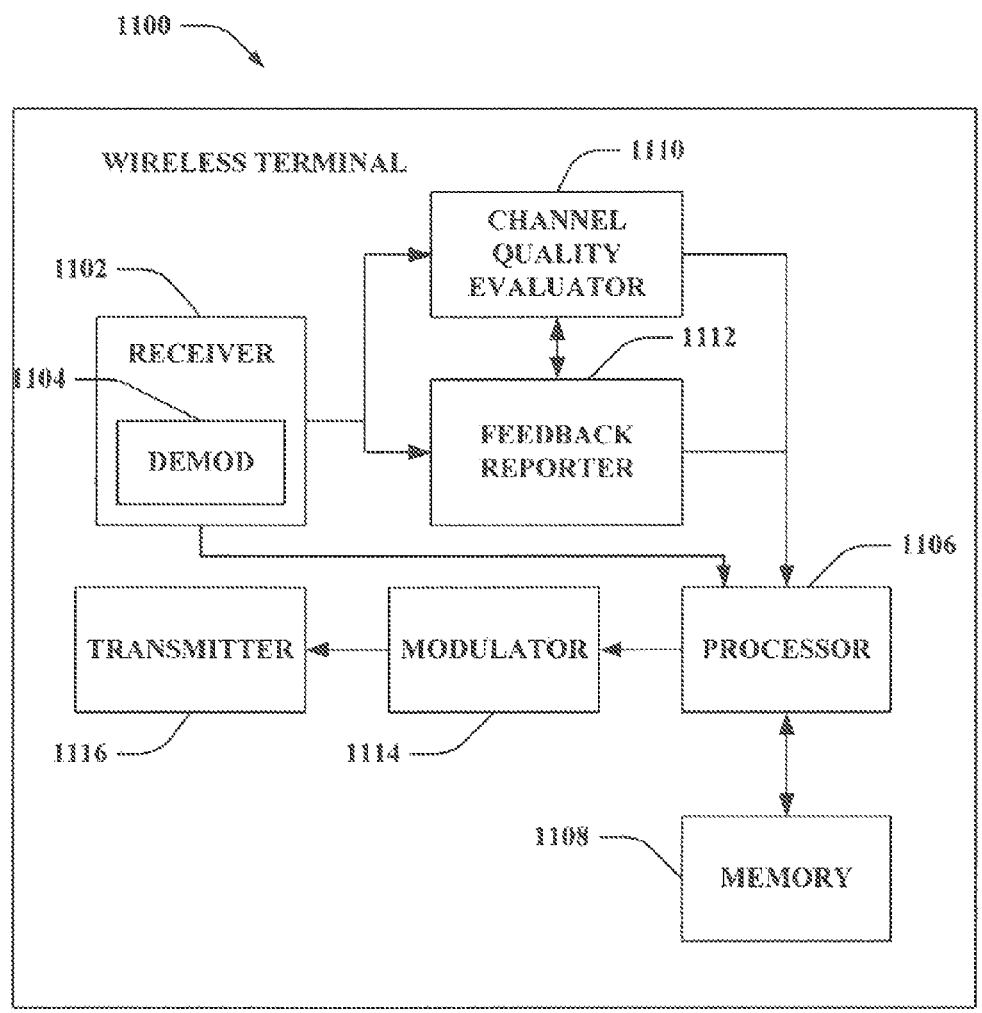
FIG. 11 is an illustration of an example mobile device that facilitates utilizing cycling over antennas for CQI computation in a MIMO wireless communication system.

FIG. 11 is an illustration of a wireless terminal 1100 that facilitates utilizing cycling over antennas for CQI computation in a MIMO wireless communication system. Wireless terminal 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of wireless terminal 1100, and/or a processor that both analyzes information received by receiver 1102, generates information for transmission by transmitter 1116, and controls one or more components of wireless terminal 1100.

Wireless terminal 1100 can additionally comprise memory 1108 that is operatively coupled to processor 1106 and that can store data to be transmitted, received data, information related to available technologies, data associated with analyzed pilots, and any other suitable information for selecting whether to effectuate an inter-technology handoff. Memory 1108 can additionally store protocols and/or algorithms associated with CQI computation as described herein.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a channel quality evaluator 1110 that evaluates pilot(s) obtained by receiver 1102. Channel quality evaluator 1110 can identify which layers (e.g., streams) are supported by wireless terminal 1100. Moreover, channel quality evaluator 1110 can compute CQIs for the supported layers by cycling through virtual antennas associated with each of the supported layers. Additionally, channel quality evaluator 1110 can be coupled to a feedback reporter 1112 that sends channel quality information (e.g., computed CQI data) to a base station. The channel quality information can be leveraged thereafter for scheduling data transmission. Wireless terminal 1100 still further comprises a modulator 1114 and a transmitter 1116 that transmits the signal to, for instance, a base station, another wireless terminal, etc. Although depicted as being separate from the processor 1106, it is to be appreciated that channel quality evaluator 1110, feedback reporter 1112 and/or modulator 1114 can be part of processor 1106 or a number of processors (not shown).

Figure 12:
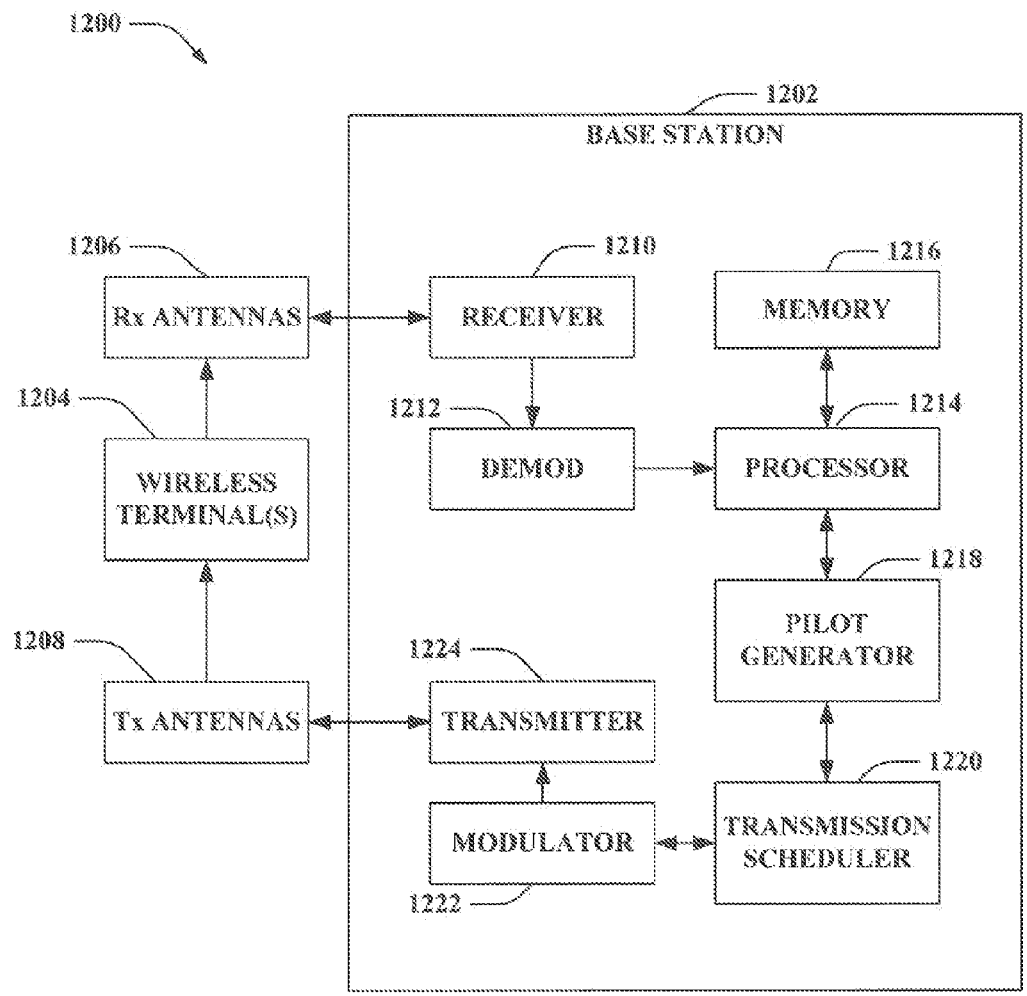
FIG. 12 is an illustration of an example system that facilitates transmitting data by leveraging spatial cycling in a MIMO wireless communication environment.

FIG. 12 is an illustration of a system 1200 that facilitates transmitting data by leveraging spatial cycling in a MIMO wireless communication environment. System 1200 comprises a base station 1202 (e.g., access point, . . . ) with a receiver 1210 that receives signal(s) from one or more wireless terminals 1204 through a plurality of receive antennas 1206, and a transmitter 1222 that transmits to the one or more wireless terminals 1204 through one or more transmit antennas 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to generating pilot(s), data to be transmitted to or received from wireless terminal(s) 1204 (or a disparate base station (not shown)), and/or any other suitable information related to performing the various actions and functions set forth herein. Processor 1214 is further coupled to a pilot generator 1218 that constructs pilot(s) that can be sent to wireless terminal(s) 1204. Pilot generator 1218 can employ a slowly varying unitary matrix to generate the pilot(s) for transmission. Moreover, the pilot(s) yielded by pilot generator 1218 can be employed by wireless terminal(s) 1204 to evaluate CQIs.

Pilot generator 1218 can be operatively coupled to a transmission scheduler 1220 that schedules data transmission based upon received CQI data. For example, transmission scheduler 1220 can enable data to be transmitted to a user by cycling across a subset of virtual antennas as described herein. Further, transmission scheduler 1220 and/or pilot generator 1218 can provide data and/or the pilot(s) to a modulator 1222. Modulator 1222 can multiplex the data and/or pilot(s) for transmission by a transmitter 1226 through antenna(s) 1208 to wireless terminal(s) 1204. Although depicted as being separate from the processor 1214, it is to be appreciated that pilot generator 1218, transmission scheduler 1220 and/or modulator 1222 can be part of processor 1214 or a number of processors (not shown).

Figure 13:
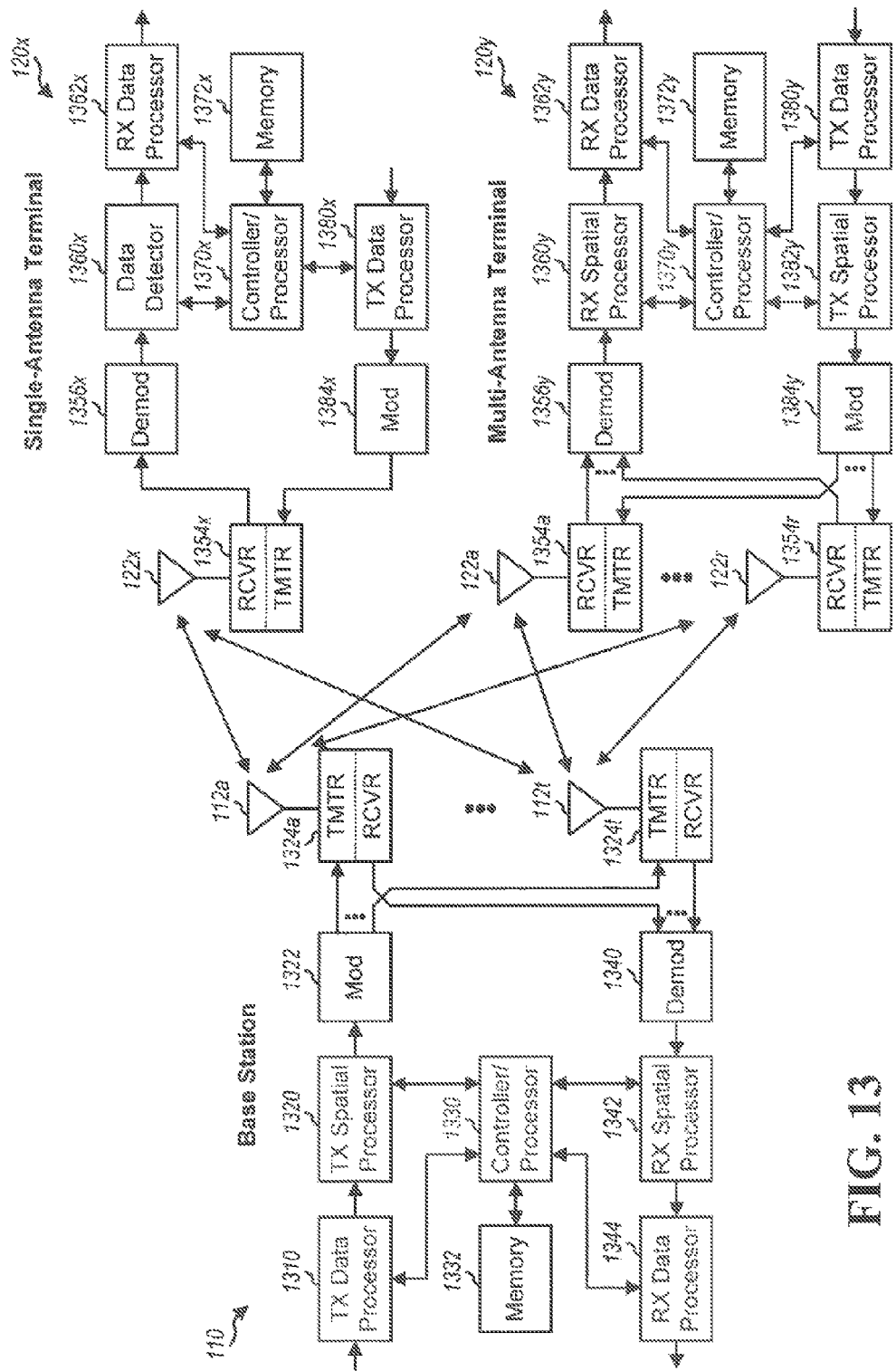
FIG. 13 is an illustration of an example wireless network environment that can be employed in conjunction with the various systems and methods described herein.

FIG. 13 shows a block diagram of an embodiment of base station 110, single-antenna terminal 120x, and multi-antenna terminal 120y. At base station 110, a transmit (TX) data processor 1310 receives data for one or more terminals, processes (e.g., encodes, interleaves, and symbol maps) the data based on one or more coding and modulation schemes, and provides modulation symbols. TX data processor 1310 typically processes the data for each terminal separately based on a coding and modulation scheme selected for that terminal. If the system utilizes SC-FDMA, then TX data processor 1310 can perform FFT/DFT on the modulation symbols for each terminal to obtain frequency-domain symbols for that terminal. TX data processor 1310 obtains output symbols for each terminal (which may be modulation symbols for OFDM or frequency-domain symbols for SC-FDMA) and multiplexes the output symbols for the terminal onto the subbands and virtual antennas used for that terminal. TX data processor 1310 further multiplexes pilot symbols onto the subbands and virtual antennas used for pilot transmission.

A TX spatial processor 1320 receives the multiplexed output symbols and pilot symbols, performs spatial processing for each subband, e.g., as shown in equation (3) or (7), and provides transmit symbols for the T transmit antennas. A modulator (Mod) 1322 processes the transmit symbols for each transmit antenna, e.g., for OFDM, SC-FDMA, or some other modulation technique, and generates an output sample stream for that transmit antenna. Since TX spatial processor 1320 performs spatial processing for each subband, the SC-FDMA modulation is divided into two parts that are performed by TX data processor 1310 and modulator 1322. Modulator 1322 provides T output sample streams to T transmitter units (TMTR) 1324a through 1324t. Each transmitter unit 1324 processes (e.g., converts to analog, amplifies, filters, and frequency upconverts) its output sample stream and generates a modulated signal. T modulated signals from transmitter units 1324a through 1324t are transmitted from T antennas 112a through 112t, respectively.

At each terminal 120, one or multiple antennas 122 receive the modulated signals transmitted by base station 110, and each antenna provides a received signal to a respective receiver unit (RCVR) 1354. Each receiver unit 1354 processes (e.g., amplifies, filters, frequency downconverts, and digitalizes) its receive signal and provides received samples to a demodulator (Demod) 1356. Demodulator 1356 processes the received samples for each receive antenna 122 (e.g., based on OFDM, SC-FDMA, or some other modulation technique), obtains frequency-domain received symbols for the K total subbands, provides received symbols for the assigned subbands, and provides received pilot symbols for the subbands used for pilot transmission.

For single-antenna terminal 120x, a data detector 1360x obtains received symbols from demodulator 1356x, derives channel estimates for the assigned subbands based on the received pilot symbols, and performs data detection (e.g., equalization) on the received symbols based on the channel estimates to obtain detected symbols, which are estimates of the output symbols transmitted to terminal 120x. For multi-antenna terminal 120y, a receive (RX) spatial processor 1360y obtains received symbols from demodulator 1356y, derives channel estimates for the assigned subbands based on the received pilot symbols, and performs receiver spatial processing on the received symbols based on the channel estimates to obtain detected symbols. RX spatial processor 1360y may implement a minimum mean square error (MMSE) technique, a zero-forcing (ZF) technique, a maximal ratio combining (MRC) technique, a successive interference cancellation technique, or some other receiver processing technique. For each terminal, an RX data processor 1362 processes (e.g., symbol demaps, deinterleaves, and decodes) the detected symbols and provides decoded data for the terminal. In general, the processing by each terminal 120 is complementary to the processing by base station 110.

Each terminal 120 can generate feedback information for the data transmission to that terminal. For example, each terminal 120 may estimate the SNRs for the virtual antennas, e.g., based on the received pilot symbols. Each terminal 120 can select one or more coding and modulation schemes, one or more packet formats, one or more virtual antennas to use for data transmission, one or more orthonormal matrices, and so on based on the SNR estimates and/or other information. Each terminal 120 can also generate acknowledgments (ACKs) for correctly received data packets. The feedback information can include the SNR estimates, the selected coding and modulation schemes, the selected virtual antenna(s), the selected orthonormal matrix(ces), the selected subband(s), ACKs, information used for power control, some other information, or any combination thereof. The feedback information is processed by a TX data processor 1380, further processed by a TX spatial processor 1382 if multiple antennas are present, modulated by a modulator 1384, conditioned by transmitter unit(s) 1354, and transmitted via antenna(s) 122 to base station 110. At base station 110, the modulated signals transmitted by terminals 120x and 120y are received by antennas 112, conditioned by receiver units 1324, and processed by a demodulator 1340, an RX spatial processor 1342, and an RX data processor 1344 to recover the feedback information sent by the terminals. A controller/processor 1330 uses the feedback information to determine the data rates and coding and modulation schemes to use for the data transmission to each terminal as well as to generate various controls for TX data processor 1310 and TX spatial processor 1320.

Controllers/processors 1330, 1370x and 1370y control the operation of various processing units at base station 110 and terminals 120x and 120y, respectively. Memory units 1332, 1372x and 1372y store data and program codes used by base station 110 and terminals 120x and 120y, respectively. Controller/processor 1330 can assign subbands and select the spatial multiplexing order for each terminal and select the virtual antennas for each subband assigned to each terminal, for instance. For the determination of CQI, processors 1370 can coordinate the processes of determining and demapping the slowly varying $U_{N_f \times N_f}$ used to cycle the pilots.

For clarity, much of the description above is for a system with K total subbands. The transmission techniques described herein may also be used for a system with a single subband. For such a system, k in the description above may be an index for symbol period instead of subband.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 14:
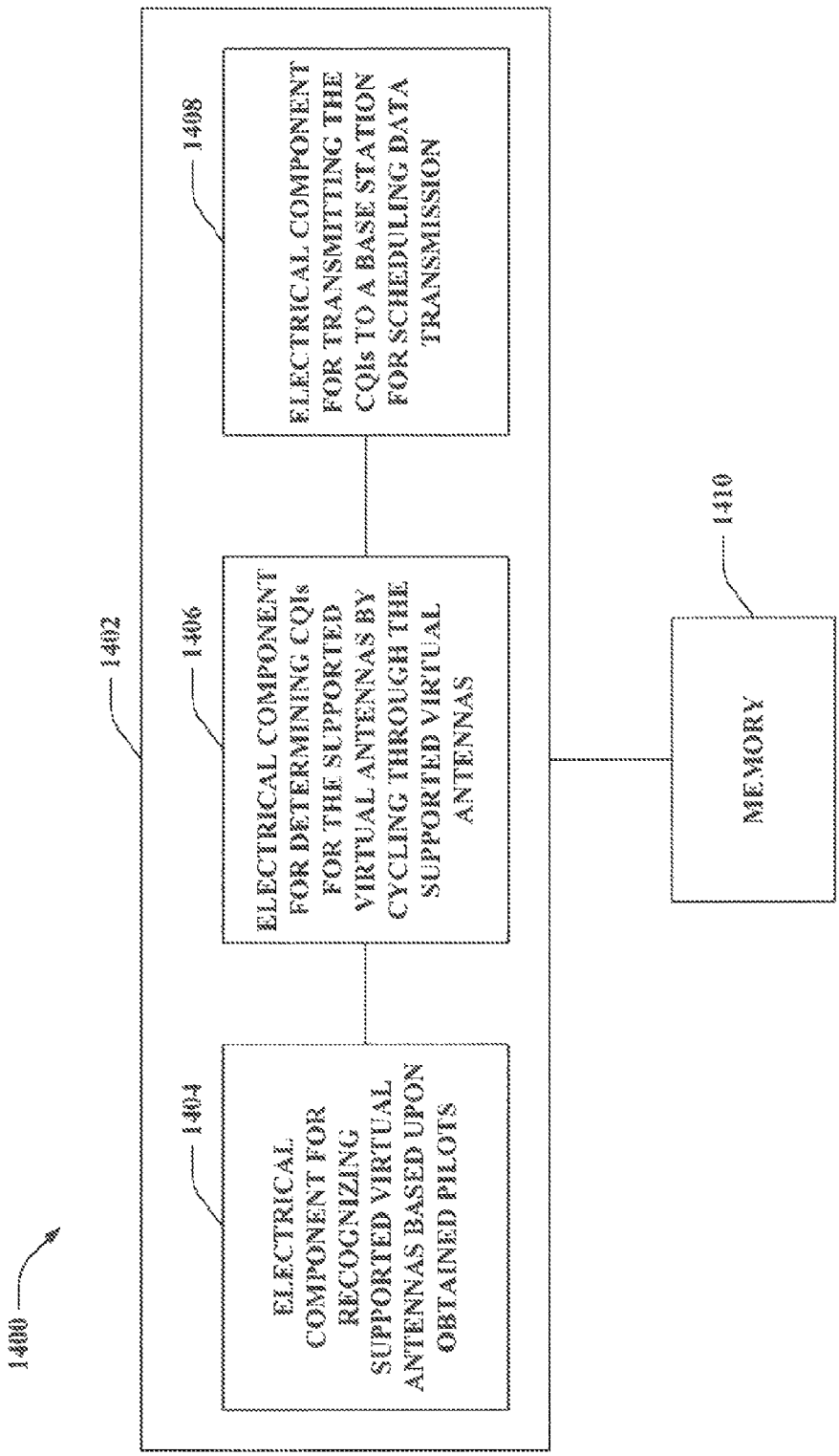
FIG. 14 is an illustration of an example system that enables computing CQIs in a MIMO wireless communication environment.

With reference to FIG. 14, illustrated is a system 1400 that enables computing CQIs in a MIMO wireless communication environment. For example, system 1400 can reside at least partially within a wireless terminal. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for recognizing supported virtual antennas based upon obtained pilots 1404. Further, logical grouping 1402 can comprise an electrical component for determining CQIs for the supported virtual antennas by cycling through the supported virtual antennas 1406. Moreover, logical grouping 1402 can include an electrical component for transmitting the CQIs to a base station for scheduling data transmission 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
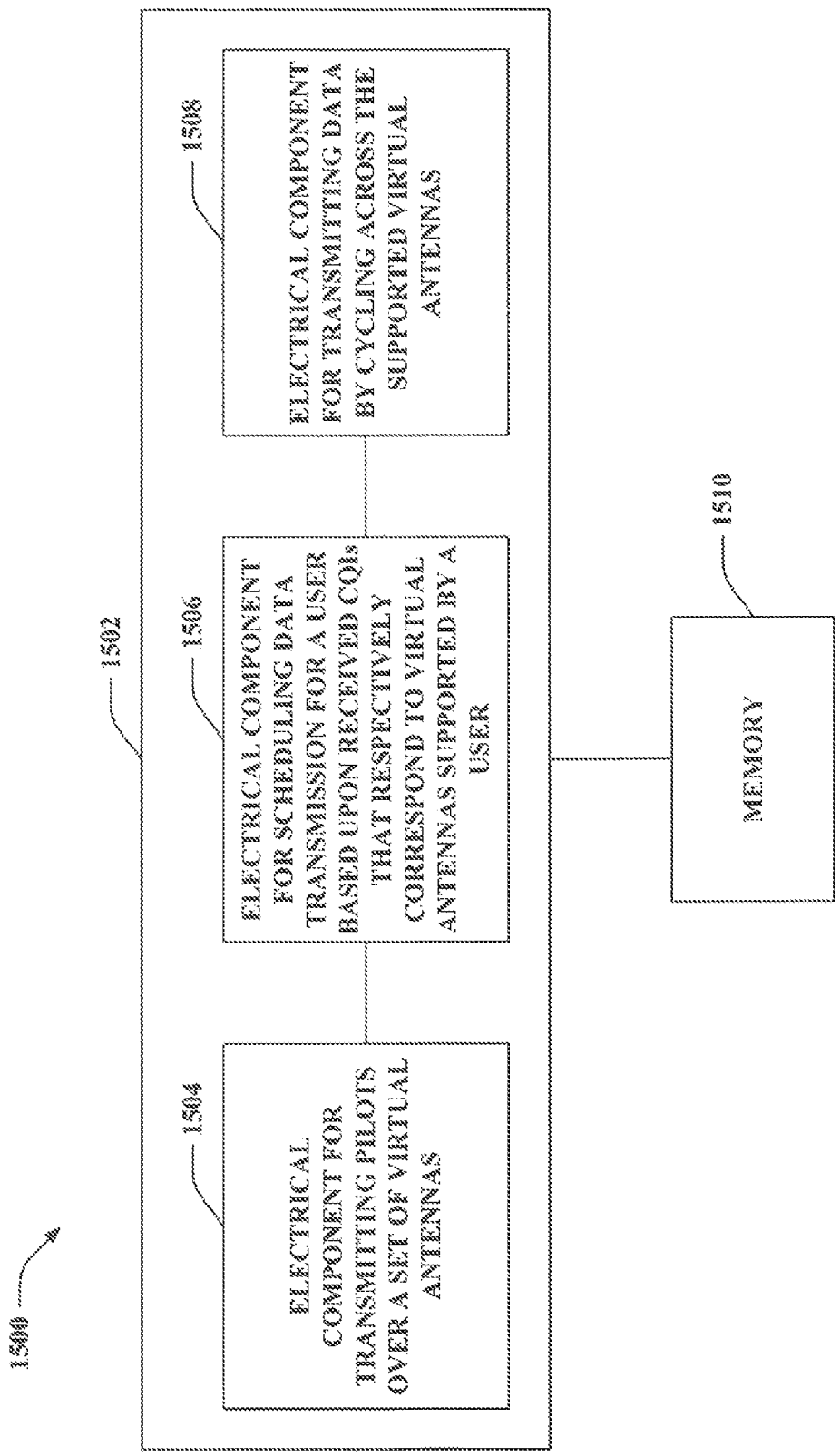
FIG. 15 is an illustration of an example system that enables scheduling transmission and sending data in a MIMO wireless communication environment.

Turning to FIG. 15, illustrated is a system 1500 that enables scheduling transmission and sending data in a MIMO wireless communication environment. System 1500 can reside within a base station, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for transmitting pilots over a set of virtual antennas 1504. Moreover, logical grouping 1502 can include an electrical component for scheduling data transmission for a user based upon received CQIs that respectively correspond to virtual antennas supported by a user 1506. Further, logical grouping 1502 can include an electrical component for transmitting data by cycling across the supported virtual antennas 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates evaluating channel quality information in a multiple-input multiple-output (MIMO) wireless communication environment, comprising:
   obtaining pilots from a base station;
   estimating a physical antenna channel from the pilots;
   identifying possible layers based upon the estimated physical antenna channel;
   cycling through a plurality of precoding matrices based upon the estimated physical antenna channel;
   computing a set of channel quality indicators (CQIs) by cycling through virtual antennas associated with supported layers, wherein each CQI corresponds to a respective one of the supported layers; and
   sending at least one of an index of a selected precoding matrix and an index for the set of CQIs to the base station for scheduling data transmission.

2. The method of claim 1, further comprising identifying the number of layers supported by the physical antenna channel by analyzing signal power ratios related to the layers.

3. The method of claim 1, further comprising determining a control channel CQI based upon a first virtual antenna response.

4. The method of claim 1, wherein the MIMO communication environment employs open loop MIMO with at least one of symbol rate hopping or block hopping.

5. The method of claim 1, wherein the MIMO communication environment employs closed loop MIMO with at least one of symbol rate hopping or block hopping.

6. The method of claim 1, further comprising receiving data from the base station, wherein the base station transmits the data on the same virtual antennas associated with the supported layers used for CQI computation.

7. The method of claim 6, wherein the base station cycles over the virtual antennas associated with the supported layers for diversity.

8. The method of claim 1, wherein each CQI in the set of CQIs individually corresponds to one supported virtual antenna.

9. The method of claim 1, wherein the physical channel is estimated based on a permutation effect on CQI pilots.

10. A wireless communications apparatus, comprising:
    a memory that retains instructions related to estimating a physical antenna channel from received pilots, identifying possible layers based upon the estimated physical antenna channel, cycling through a plurality of precoding matrices based upon the estimated physical antenna channel, computing a set of channel quality indicators (CQIs) by cycling through virtual antennas associated with supported layers, wherein each CQI relates to a respective one of the supported layers, and transmitting at least one of an index of a chosen precoding matrix and an index for the set of CQIs to a base station for scheduling data transmission; and
    a processor, coupled to the memory, configured to execute the instructions retained in the memory.

11. The wireless communications apparatus of claim 10, wherein the memory further retains instructions related to analyzing signal power ratios related to the layers based upon the received pilots.

12. The wireless communications apparatus of claim 10, wherein the memory further retains instructions related to determining a control channel CQI based upon a first virtual antenna response.

13. The wireless communications apparatus of claim 10, wherein an open loop MIMO environment is employed with one or more of symbol rate hopping or block hopping.

14. The wireless communications apparatus of claim 10, wherein a closed loop MIMO environment is employed with one or more of symbol rate hopping or block hopping.

15. The wireless communications apparatus of claim 10, wherein the memory further retains instructions related to obtaining data transmitted on the same virtual antennas used for CQI evaluation.

16. The wireless communications apparatus of claim 15, wherein the data is transmitted by cycling over the virtual antennas to provide diversity.

17. A wireless communications apparatus that enables computing channel quality indicators (CQIs) in a multiple-input multiple-output (MIMO) wireless communications environment, comprising:
    means for estimating a physical antenna channel from obtained pilots;
    means for identifying possible layers based upon the estimated physical antenna channel;
    means for cycling through a plurality of precoding matrices based upon the estimated physical antenna channel;
    means for determining a set of CQIs by cycling through virtual antennas associated with supported layers, wherein each CQI relates to a respective one of the supported layers; and
    means for sending at least one of an index of a selected precoding matrix and an index for the set of CQIs to a base station for scheduling data transmission.

18. The wireless communications apparatus of claim 17, further comprising means for determining a control channel CQI based upon a first virtual antenna response.

19. The wireless communications apparatus of claim 17, wherein the MIMO communication environment employs open loop MIMO with at least one of symbol rate hopping or block hopping.

20. The wireless communications apparatus of claim 17, wherein the MIMO communication environment employs closed loop MIMO with at least one of symbol rate hopping or block hopping.

21. The wireless communications apparatus of claim 17, further comprising means for receiving data transmitted by the base station on the supported virtual antennas, wherein the base station cycles over the supported virtual antennas.

22. A non-transitory machine-readable medium having stored thereon machine-executable instructions for:
    receiving pilots from a base station;
    estimating a physical antenna channel from the pilots;
    identifying possible layers based upon the estimated physical antenna channel;
    cycling through a plurality of precoding matrices based upon the estimated physical antenna channel;
    generating a set of channel quality indicators (CQIs) by cycling through virtual antennas associated with supported layers, wherein each CQI corresponds to a respective one of the supported layers; and sending at least one of an index of a selected precoding matrix and an index for the set of CQIs to the base station for scheduling data transmission.

23. The machine-readable medium of claim 22, the machine-executable instructions further comprise determining a control channel CQI based upon a first virtual antenna response.

24. The machine-readable medium of claim 22, wherein an open loop MIMO environment is employed with one or more of symbol rate hopping or block hopping.

25. The machine-readable medium of claim 22, wherein a closed loop MIMO environment is employed with one or more of symbol rate hopping or block hopping.

26. The machine-readable medium of claim 22, the machine-executable instructions further comprise obtaining data transmitted by the base station via cycling over the same virtual antennas employed for CQI generation.

27. In a wireless communications system, an apparatus comprising:
a processor configured to:
estimate a physical antenna channel from obtained pilots;
identify possible layers based upon the estimated physical antenna channel;
cycle through a plurality of precoding matrices based upon the estimated physical antenna channel;
determine a set of channel quality indicators (CQIs) cycling through virtual antennas associated with supported layers, wherein each CQI relates to a respective one of the supported layers; and
transmit at least one of an index of a selected precoding matrix and an index for the set of CQIs to a base station for scheduling data transmission.

28. A method that facilitates transmitting data from a base station in a multiple-input multiple-output (MIMO) wireless communication environment, comprising:
sending channel quality indicator (CQI) pilots over a set of virtual antennas;
obtaining one or more CQIs that respectively pertain to one or more supported virtual antennas for a user and obtaining an index of a selected precoding matrix, wherein the selected precoding matrix optimizes capacity, the one or more supported virtual antennas being a subset of the virtual antennas;
selecting to transmit over a second number of virtual antennas that differs from a first number of supported virtual antennas;
adjusting a power level for data transmission based upon a ratio of the first number to the second number;
scheduling data transmission for the user based upon the CQI data; and
transmitting data by using the selected precoding matrix and cycling across the one or more supported virtual antennas.

29. The method of claim 28, further comprising generating the CQI pilots based upon a varying unitary matrix.

30. The method of claim 28, further comprising obtaining null CQIs that correspond to non-supported virtual antennas.

31. The method of claim 28, scheduling data transmission based upon fairness and the CQI data.

32. The method of claim 28, wherein the MIMO communication environment employs open loop MIMO with at least one of symbol rate hopping or block hopping.

33. The method of claim 31, wherein the MIMO communication environment employs closed loop MIMO with at least one of symbol rate hopping or block hopping.

34. A method that facilitates transmitting data from a base station in a multiple-input multiple-output (MIMO) wireless communication environment, comprising:
sending channel quality indicator (CQI) pilots over a set of virtual antennas;
obtaining one or more CQIs that respectively pertain to one or more supported virtual antennas for a user and obtaining an index of a selected precoding matrix, wherein the selected precoding matrix optimizes capacity, the one or more supported virtual antennas being a subset of the virtual antennas;
scheduling data transmission for the user based upon the CQI data; and
transmitting data by using the selected precoding matrix and cycling across the one or more supported virtual antennas wherein transmitting data further comprises exciting columns of a unitary matrix on each tile pertaining to the one or more supported virtual antennas while in block hopping mode.

35. A wireless communications apparatus, comprising:
a memory that retains instructions related to transmitting pilots over a set of virtual antennas, receiving one or more channel quality indicators (CQIs) that respectively pertain to one or more supported virtual antennas for a user and receiving an index of a selected precoding matrix, wherein the selected precoding matrix optimizes capacity, the one or more supported virtual antennas being a subset of the virtual antennas, scheduling data transmission for the user based upon the CQI data, transmitting data by using the selected precoding matrix and cycling over the one or more supported virtual antennas, choosing to transmit over a differing number of virtual antennas in comparison to a number of supported virtual antennas and altering a power level for data transmission; and
a processor, coupled to the memory, configured to execute the instructions retained in the memory.

36. The wireless communications apparatus of claim 35, wherein the memory further retains instructions related to generating the pilots based upon a varying unitary matrix.

37. The wireless communications apparatus of claim 35, wherein the memory further retains instructions related to scheduling data transmission based upon fairness and the CQI data.

38. The wireless communications apparatus of claim 35, wherein an open loop MIMO environment is employed with one or more of symbol rate hopping or block hopping.

39. The wireless communications apparatus of claim 35, wherein a closed loop MIMO environment is employed with one or more of symbol rate hopping or block hopping.

40. A wireless communications apparatus, comprising:
a memory that retains instructions related to transmitting pilots over a set of virtual antennas, receiving one or more channel quality indicators (CQIs) that respectively pertain to one or more supported virtual antennas for a user and receiving an index of a selected precoding matrix, wherein the selected precoding matrix optimizes capacity, the one or more supported virtual antennas being a subset of the virtual antennas, scheduling data transmission for the user based upon the CQI data, transmitting data by using the selected precoding matrix and cycling over the one or more supported virtual antennas, wherein transmitting data further comprises exciting columns of a unitary matrix on each tile while in block hopping mode, the columns relate to the one or more supported virtual antennas; and a processor, coupled to the memory, configured to execute the instructions retained in the memory.

41. A wireless communications apparatus that enables scheduling transmission and sending data in a multiple-input multiple-output (MIMO) wireless communication environment, comprising:
means for transmitting pilots over a set of virtual antennas;
means for scheduling data transmission for a user based upon received channel quality indicators (CQIs) that respectively correspond to virtual antennas supported by the user and a received index of a selected precoding matrix, wherein the selected precoding matrix optimizes capacity;
means for selecting to transmit over a number of virtual antennas that differs from a number of supported virtual antennas;
means for adjusting a power level for data transmission; and
means for transmitting data by using the selected precoding matrix and cycling across the supported virtual antennas.

42. The wireless communications apparatus of claim 41, further comprising means for generating the pilots based upon a varying unitary matrix.

43. The wireless communications apparatus of claim 41, wherein the MIMO communication environment employs open loop MIMO with at least one of symbol rate hopping or block hopping.

44. The wireless communications apparatus of claim 41, wherein the MIMO communication environment employs closed loop MIMO with at least one of symbol rate hopping or block hopping.

45. A wireless communications apparatus that enables scheduling transmission and sending data in a multiple-input multiple-output (MIMO) wireless communication environment, comprising:
means for transmitting pilots over a set of virtual antennas;
means for scheduling data transmission for a user based upon received channel quality indicators (CQIs) that respectively correspond to virtual antennas supported by the user and a received index of a selected precoding matrix, wherein the selected precoding matrix optimizes capacity;
means for exciting columns of a unitary matrix on each tile while in block hopping mode, the columns relate to the one or more supported virtual antennas; and
means for transmitting data by using the selected precoding matrix and cycling across the supported virtual antennas.

46. A non-transitory machine-readable medium having stored thereon machine-executable instructions for:
sending pilots over a set of virtual antennas, the pilots being generated based upon a unitary matrix;
scheduling data transmission for a user based upon received channel quality indicators (CQIs) that respectively correspond to virtual antennas supported by the user and a received index of a selected precoding matrix, wherein the selected precoding matrix optimizes capacity;
transmitting data by using the selected precoding matrix and cycling across the supported virtual antennas; and
adjusting a power level for transmitting data when a number of virtual antennas other than the number of supported virtual antennas is employed.

47. The machine-readable medium of claim 46, wherein an open loop MIMO environment is employed with one or more of symbol rate hopping or block hopping.

48. The machine-readable medium of claim 46, wherein a closed loop MIMO environment is employed with one or more of symbol rate hopping or block hopping.

49. A non-transitory machine-readable medium having stored thereon machine-executable instructions for:
sending pilots over a set of virtual antennas, the pilots being generated based upon a unitary matrix;
scheduling data transmission for a user based upon received channel quality indicators (CQIs) that respectively correspond to virtual antennas supported by the user and a received index of a selected precoding matrix, wherein the selected precoding matrix optimizes capacity;
transmitting data by using the selected precoding matrix and cycling across the supported virtual antennas; and
exciting columns of the unitary matrix on each tile while in block hopping mode for transmitting data, the columns relate to the one or more supported virtual antennas.

50. In a wireless communications system, an apparatus comprising:
a processor configured to:
send channel quality indicator (CQI) pilots over a set of virtual antennas;
obtain one or more CQIs that respectively pertain to one or more supported virtual antennas for a user and obtain an index of a selected precoding matrix, wherein the selected precoding matrix optimizes capacity, the one or more supported virtual antennas being a subset of the virtual antennas;
select to transmit over a second number of virtual antennas that differs from a first number of supported virtual antennas;
adjust a power level for data transmission based upon a ratio of the first number to the second number;
schedule data transmission for the user based upon the CQI data; and
transmit data by using the selected precoding matrix and cycling across the one or more supported virtual antennas.

* * * * *